United States Patent
Hull et al.

(10) Patent No.: US 9,953,302 B2
(45) Date of Patent: Apr. 24, 2018

(54) SOCIAL NETWORK WITH FIELD LEVEL CONTROL OF DATA EXPOSURE

(75) Inventors: Mark E. Hull, San Jose, CA (US); F. Randall Farmer, Palo Alto, CA (US); Ellen S. Perelman, San Francisco, CA (US)

(73) Assignee: EXCALIBUR IP, LLC, New York, NY (US)

(*) Notice: Subject to any disclaimer, the term of this patent is extended or adjusted under 35 U.S.C. 154(b) by 161 days.

(21) Appl. No.: 13/197,409

(22) Filed: Aug. 3, 2011

(65) Prior Publication Data

US 2011/0289011 A1   Nov. 24, 2011

Related U.S. Application Data

(63) Continuation of application No. 13/022,399, filed on Feb. 7, 2011, which is a continuation of application No. 10/863,926, filed on Jun. 8, 2004, now Pat. No. 7,885,901.

(60) Provisional application No. 60/544,639, filed on Feb. 13, 2004, provisional application No. 60/540,505, filed on Jan. 29, 2004.

(51) Int. Cl.
| | |
|---|---|
| G06Q 10/00 | (2012.01) |
| G06Q 10/10 | (2012.01) |
| G06Q 30/02 | (2012.01) |
| G06Q 30/06 | (2012.01) |
| G06Q 50/00 | (2012.01) |
| H04L 12/58 | (2006.01) |
| H04L 29/08 | (2006.01) |

(52) U.S. Cl.
CPC ........... *G06Q 10/107* (2013.01); *G06Q 30/02* (2013.01); *G06Q 30/0601* (2013.01); *G06Q 50/01* (2013.01); *H04L 51/32* (2013.01); *H04L 67/306* (2013.01)

(58) Field of Classification Search
CPC combination set(s) only.
See application file for complete search history.

(56) References Cited

U.S. PATENT DOCUMENTS

| | | | |
|---|---|---|---|
| 2002/0023230 A1* | 2/2002 | Bolnick et al. | 713/202 |
| 2002/0059201 A1* | 5/2002 | Work | 707/3 |
| 2003/0220980 A1* | 11/2003 | Crane | 709/207 |

* cited by examiner

*Primary Examiner* — Gabrielle A McCormick
(74) *Attorney, Agent, or Firm* — James J. DeCarlo; Greenberg Traurig, LLP

(57) ABSTRACT

A method, apparatus, and system are directed towards seeding a user's contacts for their online social network. The invention is arranged to automatically recommend to the user a set of seed contacts that the user may employ to invite to join their social network. The set of seed contacts may be harvested from the user's existing portal activities, as well as other sources. In one embodiment, the invention analyzes portal activity, such as email exchanges with the user, and the like, to determine a frequency of contact with the user. Other sources may include but not be limited to emails, names within an address book of the user, names within an address book of another person, a buddy list, an instant messaging list, an activity, a mailing list, an online discussion group, a membership in a category, chat group, and the like.

18 Claims, 6 Drawing Sheets

SOCIAL NETWORK WITH FIELD LEVEL CONTROL OF DATA EXPOSURE

CROSS REFERENCE TO RELATED APPLICATIONS

This application is a continuation of, and claims priority from co-pending U.S. patent application Ser. No. 13/022,399, filed Feb. 7, 2011, entitled, "Method and System for Seeding Online Social Network Contacts" which claims benefit of U.S. patent application Ser. No. 10/863,926, filed Jun. 8, 2004, now U.S. Pat. No. 7,885,901, entitled, "Method and System for Seeding Online Social Network Contacts", which claims the benefit of U.S. Provisional Application, titled "System and Method for Social Networking," Ser. No. 60/540,505 filed on Feb. 13, 2004, and U.S. Provisional Application, titled "System and Method for Social Networking," Ser. No. 60/544,639 filed on Jan. 29, 2004, the benefit of the earlier filing date of all of which is hereby claimed under 35 U.S.C. § 119(e) and all are further incorporated by reference.

PART 1

FIELD OF THE INVENTION

The present invention relates generally to computing software, and more particularly, but not exclusively to a method and system for seeding contacts for a user's online social network.

BACKGROUND OF THE INVENTION

Social networking is a concept that an individual's personal network of friends, family colleagues, coworkers, and the subsequent connections within those networks, can be utilized to find more relevant connections for dating, job networking, service referrals, activity partners, and the like.

A social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first-degree relationships. First-degree relationships can have varying degrees of closeness, trust, and other characteristics. These relationships can also be unidirectional or bidirectional. A unidirectional relationship typically means that a first person is willing and able to interact with a second person, but the second person may not be willing or able to interact with the first person. Conversely, a bidirectional relationship typically means that both people are willing and able to interact with each other.

Indirect personal relationships typically include relationships through first-degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second-degree relationship.

The above personal relationships, and others, can be utilized to find and develop relevant connections for a variety of objectives. Finding and developing relevant connections can be accelerated with online services. Such online social networking can be used to mine personal and/or interest relationships in a way that is often more difficult and/or time-consuming to do offline. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
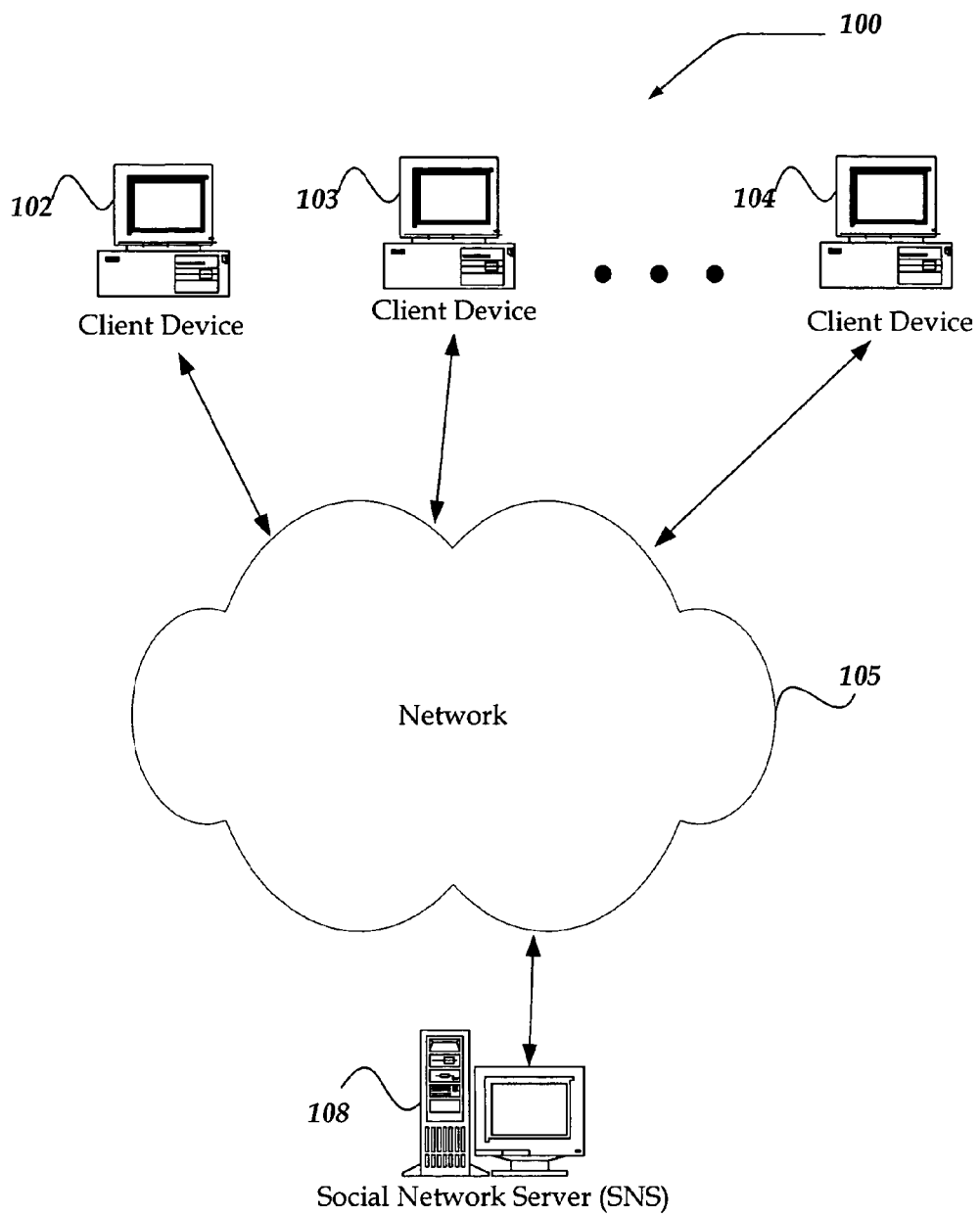
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards providing a system, apparatus, and method of seeding contacts for a user's online social network. The invention provides a user with an easy way to build and mine personal networks. As such, in one embodiment, the invention automatically recommends to the user, perhaps new to social networking, a set of seed contacts that the user may wish to invite to join their social network. The set of seed contacts that are recommended may be harvested from the user's existing portal activities. In one embodiment, this may include analyzing portal activity, such as a number of email exchanges with the user, and the like, to determine a frequency of contact with the user. This may further include other connections, associations, and the like, including, but not limited to emails, names within an address book of the user, names within an address book of another person within the portal, a buddy list, an instant messaging buddy list, a mailing list, an online discussion group, an activity, chat group, and the like. By automatically recommending seed contacts to the user's online social network, the user is freed from having to create their own contacts from scratch.

Accordingly, as employed herein, the term "user" can include an online portal subscriber and/or an online social network user. The term social network can include a group of people with which a user has direct and/or indirect relationships, as well as a service for communicating information to and/or from any of the people with which a user has direct and/or indirect relationships.

An indirect relationship can also be through a shared interest, without any degree of personal relationship between intermediate contacts. For example, a set of complete strangers can comprise a social network based on a common interest in a topic or an activity, such as fishing. At first, each person may only have a relationship with the activity of fishing, without any relationship through other people in the set. However, the activity of fishing can act as a node that binds the set of people into a social network, just as if the node were a mutual friend of each person in the set. The members of the set can build people relationships by somehow expressing to each other the common interest in the activity. Once a person is aware of another person with the same interest, the people can choose to interact. Thus, the term social network includes a group of people associated by a common interest and/or a service for communicating information to and/or from any of the people with which a user has an interest relationship.

To build a trust base quickly, information about another member gathered from other venues can be provided to a new member of the online social network. For example, information about another member's behavior in an online portal can be made accessible to the new member of the online social network. Information about the new members' behavior may also be employed to seed their own contact list. In addition to behavior information, such portal information can comprise user-defined information, portal assessment information, and the like. User-defined information can include contact lists, preferences, survey responses, and other information provided by the user. User behavior information can include frequency of visiting Web sites, types of online purchases, types of online communication used most often, duration of participating in online activities, and other information that can be detected about a user's online actions. Portal assessment information can include compliments about a user, complaints about a user, reputation assessments from peer users, comparison between user-defined information and user behavior information, spam detection about a user, and other information determined by others about a user. Many other types of information can be stored and/or determined by an online portal regarding a user. The present invention enables a member of an online social network to access and/or share portal information, thereby enabling the member to learn more about each other, to quickly identify compatible members, to create a basis for rapid seeding and viral-style growth of their social network, thus, freeing the member from having to create a contact list from scratch, and generally to enhance experiences relating to the online social network.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 100 includes client devices 102-104, a network 105, and a social network server (SNS) 108. Network 105 is in communication with and enables communication between each of client devices 102-104, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie-talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to access and/or manage a portal profile, an SNS profile, SNS category information, SNS activity participation, and the like, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to establish a user's online portal, to customize the user's interaction with an online portal, to manage the user's online portal, to customize how another social network user might view a persona, profile, or the like. For example, the user may employ the client application, in part, to establish and/or modify an online portal profile, to manage a contact list, to interact with online portal services, such as financial information tools, to make online purchase, to store and communicate with contacts, and the like. The user may also employ the client application, in part, to establish and/or modify a portal profile and/or an SNS profile, to establish categories of SNS relationships to provide one customized view of SNS profile information for family members, another customized view for poker members, yet another view for fishing buddies, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link. In essence, network 105 includes any communication method by which information may travel between client devices 102-104 and SNS 108.

The media used to transmit information in communication links as described above illustrates one type of computer-readable media, namely wired and/or wireless communication media. Generally, computer-readable media includes any media that can be accessed by a computing device. Computer-readable media may include computer storage media, communication media, or any combination thereof. Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of SNS 108 is described in more detail below in conjunction with FIG. 2. Briefly, however, SNS 108 may include any computing device capable of connecting to network 105 to communicate information between client devices 102-104. Devices that may operate as SNS 108 include personal computers desktop computers, multi-processor systems, microprocessor-based or programmable consumer electronics, network PCs, servers, and the like. SNS 108 and client devices 102-104 can be arranged in a client-server relationship relative to each other. Client devices 102-104 can also be combined with SNS 108 in virtually any other computing architecture, including, but not limited to a peer-to-peer architecture, and the like, without departing from the scope of the present invention.

SNS 108 may be configured to send and/or make accessible, portal information associated with a user, and configured to enable the user to customize at least a portion of the portal information. SNS 108 also may be configured to use the portal information and user input information as online social network information, and to enable the user to customize at least a portion of the social network information. SNS 108 may further be configured to employ the social network information, as well as other information, to automatically seed a contact list for a member. Such social network information may include, but is not limited to, user profile information, contact information, relationship category information, an activity, user-defined information, membership information associated with a relationship category, and the like.

SNS 108 may further employ the social network information to enable the user to customize a view associated with a social network relationship. By providing customized views, the user may put forth different online profiles, public personas, and the like, by sharing varying quantities of personal information with another social network user. Criteria employed to enable customization of the views may include, but is not limited to, degrees of separation, category of relationship (such as family, friend, colleague, and the like), as well as any assessment of closeness, trust, and the like, based on information about the relationship between the user and the prospective viewer, and the like. SNS 108 may also enable another social network user to view the customized view based on the received criteria. SNS 108 may employ a web service, email service, and the like, to make the customized view available to the other social network user, such as a user of one of client devices 102-104.

Illustrative Server Environment

Figure 2:
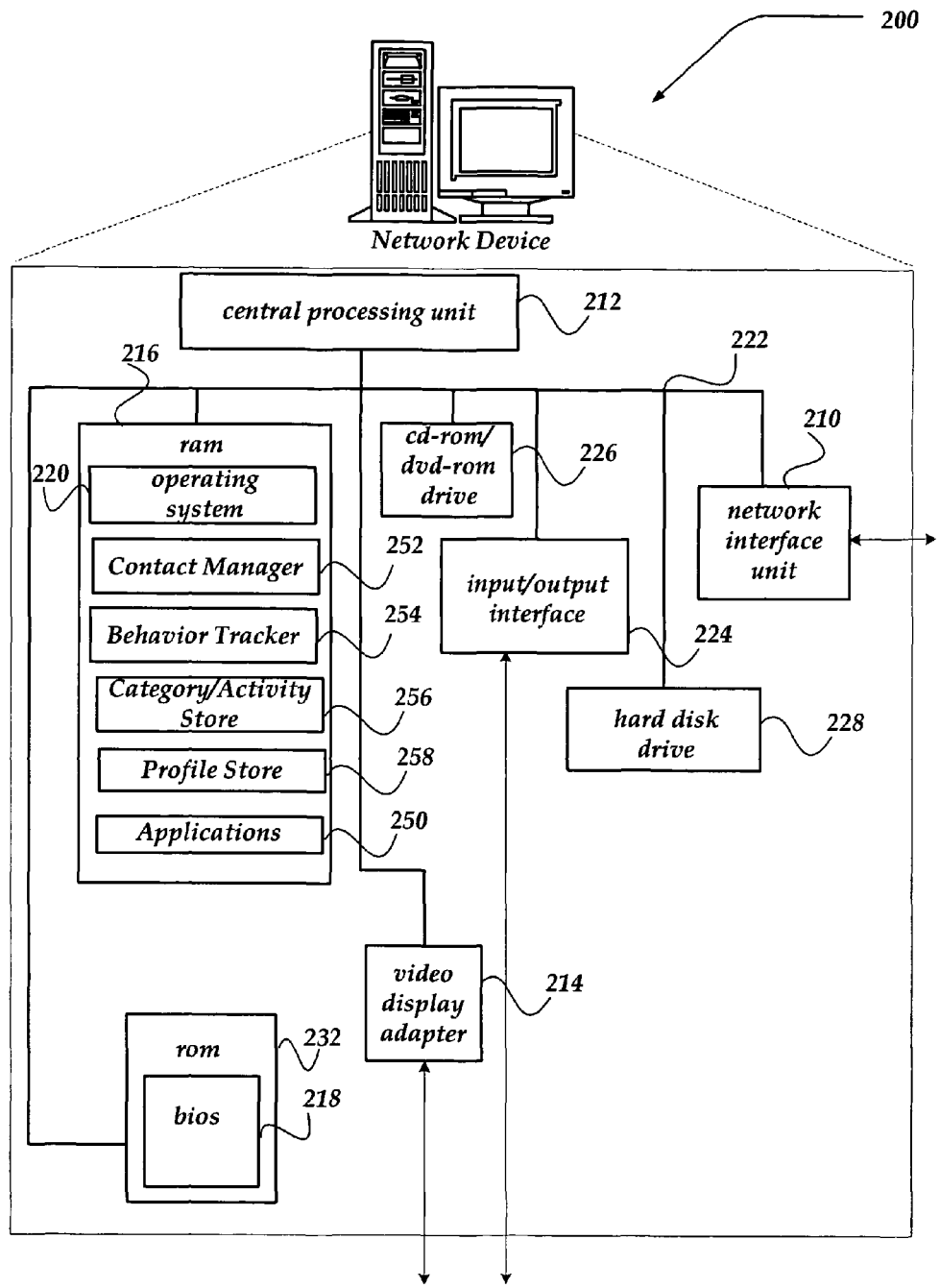
FIG. 2 shows one embodiment of a network device that may be included in a system implementing the invention.

FIG. 2 shows a functional block diagram of an exemplary network device 200, according to one embodiment of the invention. For example, network device 200 can comprise SNS 108. Client devices 102-104 can be similarly configured. Network device 200 may include many more components than those shown. The components shown, however, are sufficient to disclose an illustrative embodiment for practicing the invention.

Network device 200 includes a processing unit 212, a video display adapter 214, and a mass memory, all in communication with each other via a bus 222. The mass memory generally includes RAM 216, ROM 232, and one or more permanent mass storage devices, such as an optical drive 226, a hard disk drive 228, a tape drive, and/or a floppy disk drive. The mass memory stores an operating system 220 for controlling the operation of network device 200. Any general-purpose operating system may be employed. A basic input/output system ("BIOS") 218 is also provided for controlling low-level operation of network device 200. As illustrated in FIG. 2, network device 200 can communicate with the Internet, or some other communications network, such as network 105 of FIG. 1, via a network interface unit 210, which may be constructed for use with any of variety of communication protocols including, but not limited to, transmission control protocol/Internet protocol (TCP/IP), and the like. Network interface unit 210 is sometimes known as a transceiver, transceiving device, network interface card (NIC), and the like. Network device 200 also includes input/output interface 224 for communicating with external devices, such as a mouse, keyboard, scanner, or other input devices not shown in FIG. 2.

Network device 200 may include a simple mail transfer protocol (SMTP) handler application for transmitting and receiving email. Network device 200 may also include a hypertext transfer protocol (HTTP) handler application for receiving and handing HTTP requests, and an HTTP secure sockets (HTTPS) handler application for handling secure connections. The HTTPS handler application may initiate communication with an external application in a secure fashion.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as a contact manager 252, behavior tracker 254, category/activity store 256, and profile store 258.

Category/activity store 256 may include a database, text, folder, file, and the like, that is configured to maintain and store information that identifies a relationship category, an activity, and the like. While category/activity store 256 may store identification information, profile store 258, described below, may store profile and criteria information for each portal subscriber and/or social network user. Profile store 258 can comprise multiple distributed data stores, such as a portal subscriber profile data store, a social network profile data store, and the like.

A category may represent a classification of users and/or corresponding relationships within a user's social network, such as family members, friends, co-workers, poker buddies, fishing buddies, and the like. Social network users can establish their own categories and profile information based on corresponding portal profile data and/or manually entered data. Information relating to a category may be accessible to those identified as members of the category by the creating social network user. However, the invention is not so limited, and global categories may be established that provide profile information about a social network user to virtually any other social network user. Each category may include a set of user-definable social network user information. When the category is user-definable, the set of social network user information (profile information) may also be user-definable. For example, the user may determine that social network user information associated with hobbies may be included in a category for sports, while it may be excluded from a category associated with religion, and the like.

An activity may include virtually any way, manner, and the like, in which a social network user may select to employ their social network connections. For example, activities may include, but are not limited to, dating, job seeking, reconnecting with military comrades, communicating with fellow alumni, seeking help & advice, and the like. It may be desired, although not required, that an activity be globally configured and managed by an online social network service, and made available to all users of the online social network service. Additionally, at least a minimum set of profile information associated with the activity may be globally established. For example, if the activity includes dating, the minimum set of profile information, may include, but is not limited to age, sexual preference, information associated with one's physical appearance, and the like. If the activity includes job search, employment search, and the like, the minimum set of profile information may include, but is not limited to, job history, salary desired, job qualifications, experience, and the like. However, an activity may further include an optional set of profile information, such as achievements, hobbies, recommendations, and the like. Such profile information can be provided from the portal to the online social network service or otherwise accessed by the online social network service.

Profile store 258 may include a database, text, folder, file, and the like, that is configured to maintain and store information associated with a portal subscriber and/or a corresponding social network user. For example, a portal subscriber's portal profile may include, but is not limited to such information as name, alias, nickname, age, email address, address book, online behaviors, and the like. In one embodiment, a collection of such information may be provided to an online social network service to comprise a basic social network profile for the social network user. Additional information may also be included in profile store 258 that includes category profile information, activity profile information and the like. Such additional information may include, but is not limited to, a photograph, a hobby, a job history, a school history, career information, dating information, military information, sports information, religious information, sexual orientation, politics, interests, favorite sites, self description, frequency of accessing a Web site, duration of participating in an online activity, number of purchases made from an online vendor, and the like. In one embodiment, at least some information includes a Universal Resource Locator (URL). Virtually any information associated with the portal subscriber and associated social network user may be included within profile store 258.

Moreover, profile store 258 may store and maintain criteria associated with how profile information may be viewed by another social network user. For example, profile store 258 may include criteria indicating that only a member of a particular category may view a particular photograph, a subset of profile information, and the like. While information may be selected at a field by field level of granularity, the present invention however, is not so limited. For example, the present invention enables the social network user to establish criteria that is based on a relationship between the prospective viewer and the user. The relationship criteria may then be employed to map various collections, groupings, sets, and the like, of portal profile information, to a corresponding social network profile. As such, the social network user, for example, may establish criteria such that any other social network user that is within some predetermined degrees of separation may view a predetermined set of social network profile information that is mapped from corresponding portal profile information.

Behavior tracker 254 is configured to detect and store information regarding a portal subscriber's online actions and can determine profile characteristics about the portal subscriber. For example, behavior tracker 254 can detect that a portal subscriber navigated to one or more news Web sites at approximately the same time each day for a current month, spent approximately twenty hours playing an online game during each week of the current month, made purchases from multiple overseas vendors of software, participated in a hacker chat room, performed searches for movie times, sent an email messages to a thousand sequential addresses in one day, and/or performed other actions. From these actions, behavior tracker 254 can determine characteristics about the portal subscriber, assess the accuracy of information provided by the portal subscriber to the online portal, gather feedback about the portal subscriber submitted by other portal subscribers, and perform other tracking and evaluation operations. For instance, behavior tracker 254 can give a low weighting to portal profile information submitted by the portal subscriber, which indicated that the portal subscriber was a practicing dentist. Behavior tracker 254 might also includes a flag, indicator, and the like, indicating that the portal subscriber might be engaged in spamming. Moreover, another flag might be included that indicates that another member of the online network that may have interacted with portal subscriber was practicing potentially undesirable activity. Other aspects of behavior tracker 254 are described in more detail below in conjunction with FIG. 3.

Contact manager 252 may be configured to employ information from a variety of sources, including behavior tracker 252, profile store 258, and the like, to enable a user to manage their social networking contacts. For example, in one embodiment, when the user joins a social network, contact manager 252 may automatically recommend contacts for which the user may wish to invite to join their social network, their categories, and the like. The recommended set of seed contacts may also be harvested from the user's existing portal activities. In one embodiment, contact manager 252 may analyze portal activity, such as a number of email exchanges with the user, and the like, to determine a frequency of contact with the user. This may further include other connections, associations, and the like, including, but not limited to emails, names within an address book of the user, names within an address book of another person within the portal, a buddy list, an instant messaging buddy list, an activity, chat group, and the like. In another embodiment, a master list of contact information may also be employed as a source for seed contacts. Such master list of contact information, for example, may include a variety of sources for contacts, including, but not limited to, an address book repository, multiple source social network data stores, and the like. Contact manager 252 may then provide the set of seed contacts to the user for review, acceptance, modification, and the like. Contact manager 252, for example, may employ a process substantially similar to process 400 described below in conjunction with FIG. 4.

Although illustrated in FIG. 2 as distinct components in network device 200, contact manager 252, behavior tracker 254, category/activity store 256, and profile store 258 may be arranged, combined, and the like, in any of a variety of ways, without departing from the scope of the present invention. For example, category/activity store 256 may be arranged as separate components, such as an activity store and a category store, or the like. Moreover, contact manager 252, behavior tracker 254, category/activity store 256, and profile store 258 may reside in one or more separate computing devices, substantially similar to network device 200.

Portal Process

Figure 3:
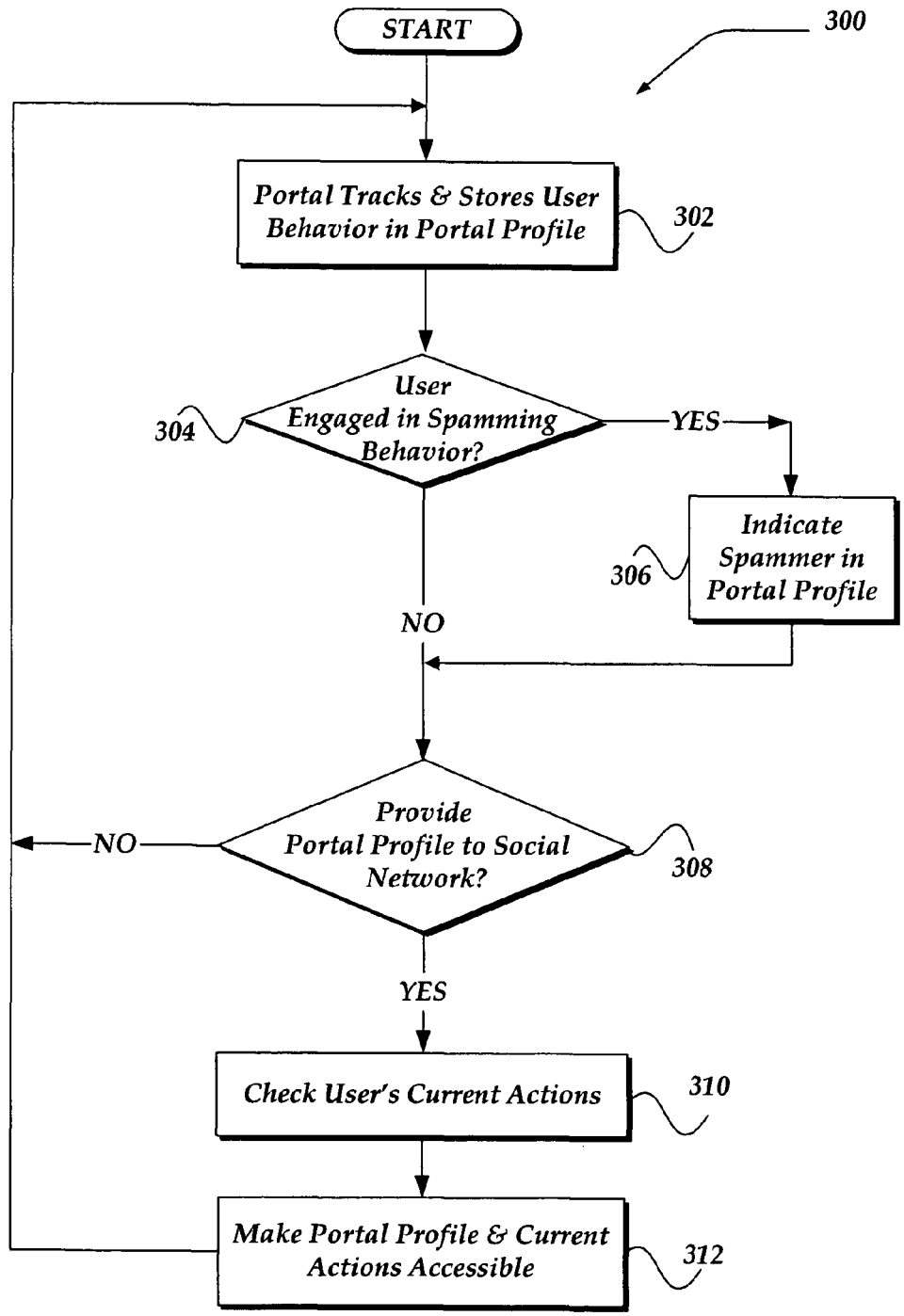
FIG. 3 illustrates a logical flow diagram generally showing one embodiment of a process for making portal information available.

The operation of certain aspects of the present invention will now be described with respect to FIGS. 3-4. Briefly, FIG. 3 illustrates a logical flow diagram generally showing one embodiment of a process for an online portal to make portal subscriber information available for use in seeding a contact list. Process 300 of FIG. 3 may be implemented, for example, within SNS 108 of FIG. 1.

The process is typically entered, after a start block, when a portal subscriber registers with an online portal. Initially, a portal subscriber's portal profile may only include a user ID. However, the portal subscriber can enter other information such a name, age, preferences, interests, contact list, and the like. The entered information may be stored in the portal profile and is usually accessible to the portal subscriber. Typically, with the portal subscriber's consent, the online portal tracks and stores the portal subscriber's behavior in the portal profile, at block 302. Some, or all, of the tracked information can be accessible to, or hidden from, the portal subscriber. In addition, the portal can add information to the portal profile indicating characteristics, possible interests, and/or other information determined about the portal subscriber. For example, the portal can determine that the portal subscriber uses the portal mostly to read news, mostly to find a job, mostly to write blogs, and/or other usage habits. Additionally, if the subscriber selects to join an activity, a group, online club, and the like, such information may also be collected and stored in the portal profile. If the subscriber receives, sends messages to another subscriber, such information may also be tracked. In fact, virtually any activity, behavior, and the like, may be tracked and stored in the subscriber's portal profile.

Moving to decision block 304, the portal can use some of the above information to determine whether the portal subscriber has engaged in spamming behavior, and/or other behavior that is deemed undesirable by portal operators, by other portal subscribers, by law, and the like. If it is determined that the portal subscriber has engaged in undesirable behavior, such as spamming, the portal can indicate this fact in the portal subscriber's portal profile, at block 306. Other actions may also be taken, as desired, including, but not limited to, warning the portal subscriber, sanctioning the portal subscriber, terminating the portal subscriber's access to the portal, and the like.

Additionally, in one embodiment, if the portal subscriber is in communication with another member that may have engaged in undesirable behavior, this fact may also be included within the information within the portal subscriber's portal profile, the other member's portal profile, and the like, at block 306.

Whether or not the portal subscriber has engaged in undesirable behavior, the process moves to decision block 308, where a determination is made whether the information already obtained through the portal is be provided to the social network. If the portal information is not being provided, portal process 300 returns to block 302 to continue tracking the portal subscriber's behavior. Otherwise, the portal process proceeds to block 310, where a check of the portal subscriber's current actions is performed. Current actions can include listening to music streamed to the portal subscriber's computer, viewing a particular Web site, and the like. Moving to block 312, the current actions and the portal profile can then be made accessible to the social network, for use in a variety of activities, including, but not limited to seeding a contact list for the portal subscriber, another portal subscriber, and the like. Portal processing may then return to block 302 to continue tracking the portal subscriber's behavior.

Seeding Online Social Network Contacts

Figure 4:
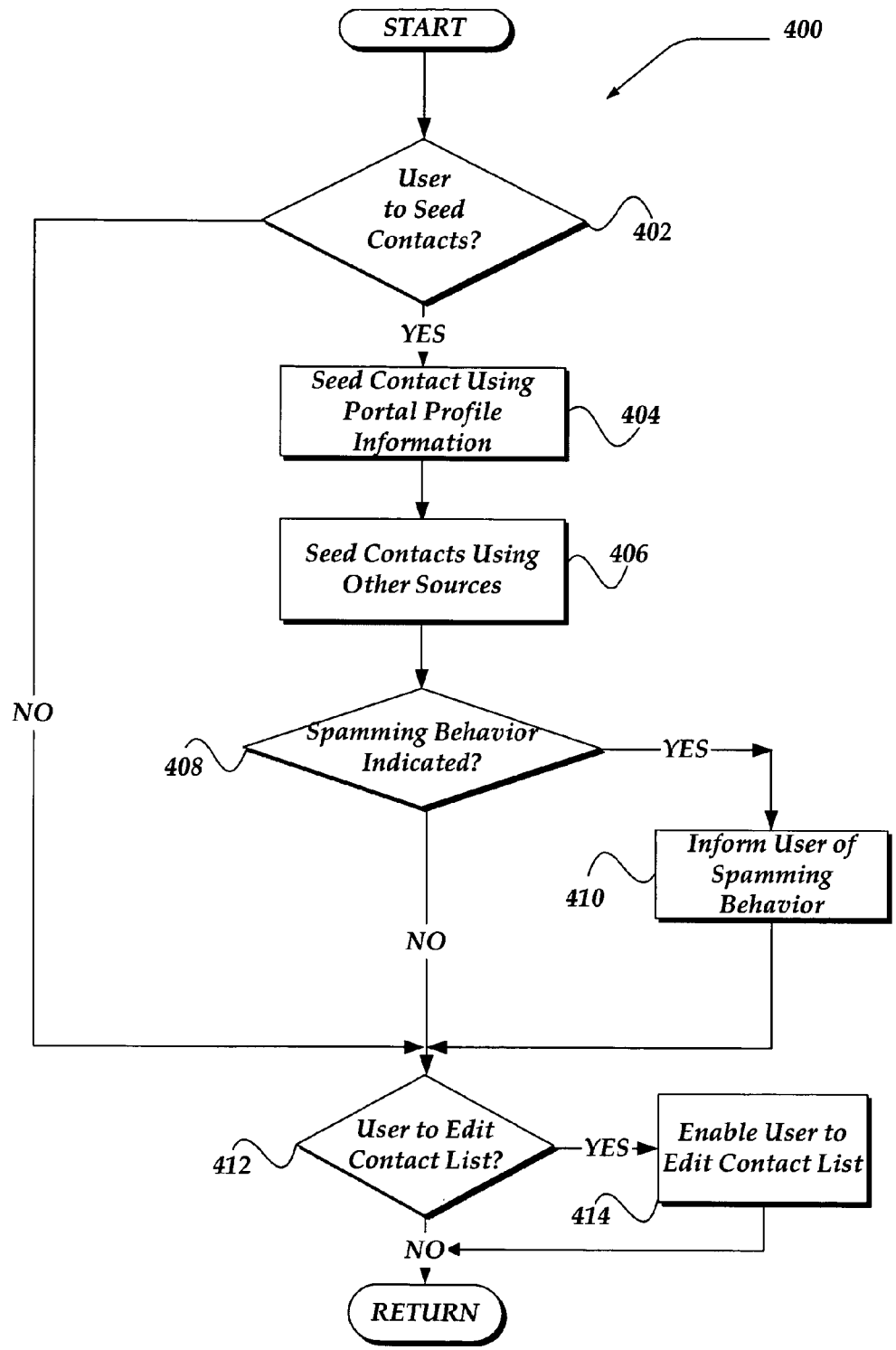
FIG. 4 illustrates a logical flow diagram generally showing one embodiment of a process for seeding an online social network contact list based, in part, on portal information, in accordance with the present invention.

FIG. 4 illustrates a logical flow diagram generally showing one embodiment of a process for seeding an online social network contact list based, in part, on portal information. Process 400 shown in FIG. 4 may be implemented, for example, within SNS 108 of FIG. 1.

Process 400 is typically entered, after a start block, at decision block 402, where a determination is made whether the user has requested seeding of their online social network contact list. In one embodiment, the user need not make the request, as the invention may be configured to determine whether the user's contact list is to be seeded. Such automatic seeding may arise, for example, when the user has recently registered as a portal subscriber and has not yet populated their contact list. Automatic seeding may also arise when it is determined that the contact list is empty, out of date, and the like. In any event, if it is determined that the user's contact list is not to be seeded, processing would then branch to decision block 412.

However, if it is determined, at decision block 402, that the user's contact list is to be seeded, processing continues to block 404. At block 404, the user's online social network contact list is seeded using portal profile information. In one embodiment, the portal profile information employed to seed the user's contact list includes the user's own portal profile information, such as that which may have been tracked and stored during process 300 of FIG. 3. Such seeding of the user's contact list may be complete or partial. That is, it may be determined that some portal profile information does not provide sufficient information about another social user to warrant importation. In another embodiment, portal profile information associated with another user within the current user's portal profile information may be used to seed the present user's contact list. This may arise, for example, where a degree of separation between the other user and the current user is within a predetermined number of degrees. It may also arise, where the current user has predefined a rule, condition, relationship, activity, and the like that may be employed to select a candidate contact for importation.

Upon completion of block 404, processing continues to block 406, where other sources for contacts are employed to seed the user's contact list. Virtually any other source may be employed to seed the user's contact list, including, but not limited to, contacts within an address book of the user, contacts within an address book of another person within the portal, a contact within a buddy list, an instant messaging buddy list, a contact within an activity for which the current user is associated, a contact within a mailing list, an online discussion group, a chat group, and the like. In one embodiment, a master list of contacts is employed, at least in part, to seed the user's contact list. Other contacts may also be derived through the above mechanisms, based on a variety of criteria, including, but not limited, to a degree of separation between contacts within the above, and the like. In any event, upon seeding the current user's contact list with information from other sources, processing proceeds to decision block 408.

At decision operation 408, the online social network service can evaluate the information now in the social network profile to determine whether a contact within the seed contact list engaged in undesirable behavior, such as spamming. The seeded contact list can be analyzed by the online social network service and/or the social network profile can simply include a flag from the portal profile, indicating that the seeded contact engaged in undesirable behavior through the portal. Based on this evaluation, the online social network service and/or members of the social network can take precautionary actions.

For example, if it is determined that a seeded contact has engaged in undesirable behavior, such as spamming, and the like, processing branches to block 410, where, the online social network service, and the like, can inform the user of the seeded contact's previous portal misbehavior(s) and/or current misbehaviors. Processing then flows to decision block 412. If, however, seeded contacts have not engaged in undesired behavior, processing also continues to decision block 412.

At decision block 412, a determination is made whether the current user is to edit the contact list. The user may decide not to modify the contact list for any of a variety of reasons, in which case, processing returns to a calling process to perform other actions. However, if the user is to edit the contact list, processing continues to block 414.

At block 414, the user can add and/or modify information in the user's contact list. For example, the user may intend to retain much of the information imported from the portal profile, which may be based, in part, on an interaction with the online portal, but remove contact information derived from some of those interactions that the user does not wish to employ. For example, where a contact is identified to have engaged in undesirable behavior, the user may wish to delete the contact from their contact list. The user may also enter contacts that have not been identified through the various mechanisms described above. Upon completion of block 414, processing returns to the calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the operations indicated in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the indicated actions, combinations of steps for performing the indicated actions and program instruction means for performing the indicated actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

PART 2

1. FIELD OF THE INVENTION

The present invention relates generally to a system and method for social networking.

2. DESCRIPTION OF THE RELATED ART

The expansion of the internet and the worldwide web ("web") has provided computer users with enhanced ability to interact with each other. Means of interaction have included email messages as well as instant messaging programs, as well as sharing thoughts and ideas in a chat room or message board.

Through these new uses of the internet, computer users have been able to develop new relationships and friendships with people that they have never met, as well as keeping up old relationships, no matter what location the two people are in. For example, while two friends might have had difficulty in the past conversing with each other on a daily basis if they were geographically separated from each other, the current system allows users to communicate and keep in touch with each other even if they may be hundreds or thousands of miles geographically separate from each other.

While this system is quite advantageous, it has many drawbacks as well. For instance, due to the simplicity of being able to interact with people so easily, many people have a plethora of contacts and find it difficult to keep track of who the person is and what relationship they have. Additionally, it would be quite advantageous if one would be able to make use of this interactive "community" to be able to share things among your friends as well as to be able to introduce friends to other friends. This, of course, has many uses, both within the social context (i.e., dating) and in the business context (i.e., establishing business relationships).

SUMMARY OF THE INVENTION

The present invention solves this and other needs by providing a system and method for social networking. This is accomplished by creating a large database of users with much personal information that users can perpetually mine. As the system obtains more information about a user it is able to use that information to uncover better ways to tailor the system to the users needs. It should be appreciated that this will accomplish customer loyalty by helping users manage their communication and interactions with their different social circles.

Additionally, one embodiment of the system integrates, other properties of the system with the social network to make their services more meaningful. For example, a search feature can filter results based upon the ratings, recommendations and interests of people similar to the user or people within the user's social network. Finally, the system can more appropriately utilize data by categorizing users by different criteria (e.g., easier to identify potential job seekers by region, profession or experience). For example the social network is integrated with existing contact or buddy lists developed through different properties (e.g., Instant Messenger, E-Mail, Groups, Chat Rooms, Games, Address Books, Personals).

The social network is also integrated with various communication and community features applications. This improves the user's experience by integrating the social network with communication applications used frequently by the user, such as E-Mail, Instant Messenger or Chat rooms. This integration makes it easier to manage communications with different groups. Additionally, these tools help increase the size and value of the social network.

Additionally, according to one embodiment, the social network system provides long-term value to users, by providing the user with easy access to key information about relationships that he or she may have. For example, users can utilize the system, for career networking, finding classmates, military or for finding potential dates.

According to another embodiment, the system also allows users to filter their experiences on other features of the system through their social networks. For example, the system lets users filter out content, recommendations and services from users who are not directly in the users network but may be not far away in relation. This results in the user obtaining recommendations from sources that he or she considers more trustworthy. This is of particular use for example, when obtaining search results, yellow pages results, movie reviews, community content and product recommendations sources.

The system according to one embodiment provides users with an easy way to build, manage and mine their personal networks. It helps users identify potential people that can help them with specific activities (e.g., friend-finding, networking or dating). The system is improved by integration with other properties throughout the system, and is a platform from which other verticals can build from. This system will build user loyalty by providing them with a single destination for managing their relationships and building new ones.

In one embodiment, the system provides users with the ability to share portal subscriber information in a social network. A user's portal based information is automatically shared when the user joins the social network. This allows the social network to utilize information that the system has already obtained about the user and incorporate that information into the user's social network. Such information can include for example, photos, calendar information, stock picks, recent music/book purchases or searches, or even dynamic information like what music the user is listening to at that time on the portal.

In an embodiment, the system is also capable of importing social network contacts from a member's existing portal-based data sources. When a portal user joins a social network, the system automatically recommends individuals whom he or she might wish to invite to join his social network based on information harvested from the user's existing portal activities. In one embodiment this might even include analyzing portal activity (e.g., total number of email exchanges with the user) to determine frequency of contact with the user. This makes use of existing subscriber connections within a portal (e.g., email, address books, Instant Messaging buddy lists, Chat Groups) as a basis for rapid mining and viral growth of a social network, freeing each user from having to create contact lists from scratch.

In an embodiment, the system also customizes views of social network user information. For example the system can limit and or customize the view of a social network user's personal information based on user-defined criteria applied to the user's relationship with each prospective viewer. Thus the user can set up one view of his information for his personal contacts (e.g., a personal persona) and a different view for his business acquaintances (e.g., a business persona). The system can also use information derived from activity such as IM, email, chat groups or other connections between users who are also online portal users. It should be understood that this allows a user to put forth differing profiles and to share varying quantities of personal information with other users based on criteria that each user can specify regarding prospective viewers of the user information such as: degrees of separation, category of relationship (friend, family, colleague, etc.), or more generally any assessment of closeness/trust based on information about the relationship between the user and the viewer. For all of the above, the system automatically creates a degree of closeness, such as for example, frequent email exchange implies closeness, with tailoring, as desired, by the user.

Additionally, in an embodiment, the system provides the ability for a social network user to selectively send an electronic message to various users. Online social network members can send electronic messages (e.g. email, IM, SMS, etc., or combinations thereof) to selected groups of users within the social network defined by user-specified criteria applied to member relationships. Conversely, such selective messaging can be used to prevent messages being received from certain users (i.e., Spam mail). It should be appreciated that this allows a user to conveniently segment his or her network into groupings (or sub-networks) based on user-specified criteria, and utilize integrated communication facilities to automatically and selectively address such segments. For example, a user can easily send an email to all his classmates by choosing his classmate criteria. Other criteria can include e.g.: degree of separation, category of relationship (friend, family, colleague, etc.), members with common interests/activities or any other criteria that can be searched on the social network. Optionally, the system by mining and analyzing user behavior can suggest additions or deletions of persons from certain groups. For example, a business group member is recognized as using gaming services on the portal, so the system suggests adding that person to the user's gaming group or sub-network.

In an embodiment, the system can also filter information based on measures of "closeness" of relationship between two or more users derived from contacts between the users. The extent of known contact between users—through portal information (e.g. email, IM, group participation, social network linkage) can be used to derive a relative measure of "closeness" between such users and this measure of "closeness: can then be used to filter information such as, product recommendations and ratings, polling queries, advertising, email (spam detection), social network communications personal ads, search results, etc.

It will be recognized for the above that this provides a better measure for analyzing the quality of relationships between users beyond mere "degree of separation" between members in an online social network. This measure better implies "a level of trust" and will therefore provide superior filtering for recommendations, personalization, polling, and other data mining for commercial and/or non-commercial content. In one embodiment this can be applied inside or outside the social networking context, as a new way of defining visible or even invisible "affinity" groups for purposes of filtering information where affinity/closeness is automatically assessed by analyzing user activities and contacts in other portal contexts. This will provide the user with a higher quality experience without compromising the user's privacy.

It should also be appreciated that in one embodiment, mobile code in wireless devices can be, used as a context for social network functionality to integrate a social network with subscription-based portal information. For example as is known in the art, BREW and Java are being used as environments in cell phones for downloadable Instant Messaging functionality and can be used to incorporate the above and below discussed functionality of the described social network system and methods.

DETAILED DESCRIPTION OF PREFERRED EMBODIMENTS

Certain preferred embodiments of the present invention will now be discussed with reference to the aforementioned figure.

Figure 5:
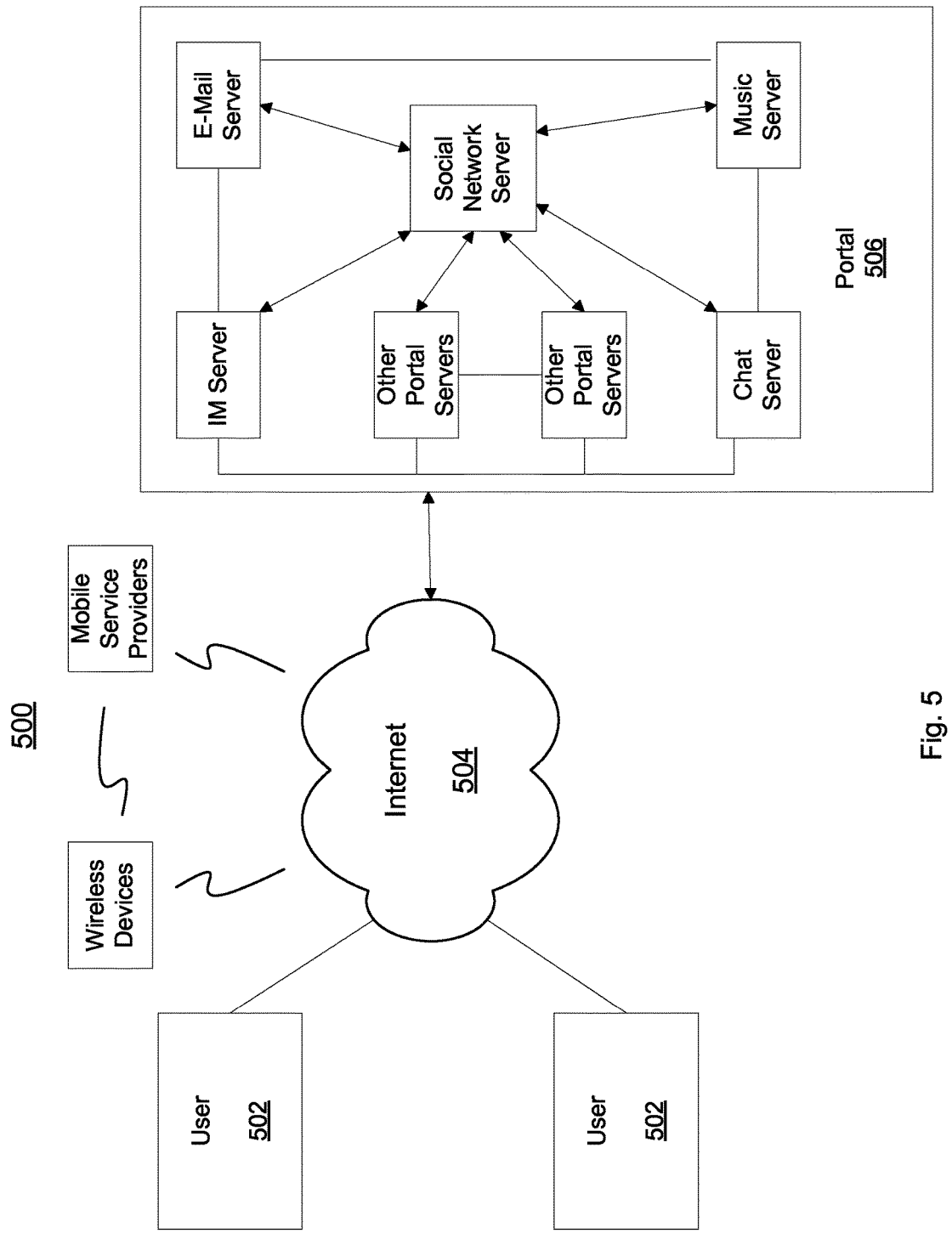
FIG. 5 is a schematic illustrating one embodiment of the present invention.

Referring now to FIG. 5, the architecture of one embodiment of the present invention is shown in schematic form. As can be seen in FIG. 5, a system 500 according to one embodiment of the invention is shown. In general, the system 500 allows users 502 to interact with each other via a social network. Each of the users 504 has a processor, such as a personal computer (PC), web-enabled cellular telephones, or personal digital assistant (FDA) and the like, coupled to the internet 504 by any one of a number of known manners. Furthermore, each user 502 preferably includes an Internet browser such as that offered by Microsoft Corporation under the trade name INTERNET EXPLORER, or that offered by Netscape Corp. under the trade name NETSCAPE NAVIGATOR. Each user 502 preferably also include an instant messaging client which is used to communicate with an instant messaging server and exchange messages between the users. One such an example of an instant messaging client is YAHOO! INSTANT MESSENGER, or any other widely known messaging client. Portal 506 is a website or service that offers a broad array of resources and services to users 502. Included in the portal is a social network server which is in communication with various other servers that are accessible through the portal. Such servers may include an instant messaging server, a music server, an e-mail server, or a chat server. As will be explained in more detail later in this application, users 502 will be able to interact with each other through use of the portal and the social networking server to make use of the various servers to interact with each other while using the social network. One Exemplary portal for use in this invention is the Yahoo! Website (www.yahoo.com). Although some features are discussed in terms of the Yahoo! website it should be understood that the system and method of the present invention can be implemented using any portal.

In general, one embodiment of the present invention allows two or more users to interact with each other through a social network and to "socialize" with each other by setting up a relationship, fostering that relationship, using various portal features to interact with each other.

It should be appreciated that in one embodiment, numerous individual servers can be used within or outside of portal 506 to receive information about each social network user. For example one dedicated server or an individual Internet Protocol (IP) Address can be set up for a particular server within the portal to receive messages or other forms of replies from users about joining a particular social network. As will be explained in more depth users can invite other users to join their social network by utilizing email or other forms of communication, these messages can be directed to a specific devoted server that is not used for managing any other relationships but only focuses on the acceptance and or rejection of the invite to join the network. It should appreciated that an added benefit of this is to allow the system to localize information about the forming or disbanding of particular social network relationships and keep that information separate and distinct from other data. Similar use of individualized servers can also be utilized for each function or any combination of the functions related to the social network.

Figure 6:
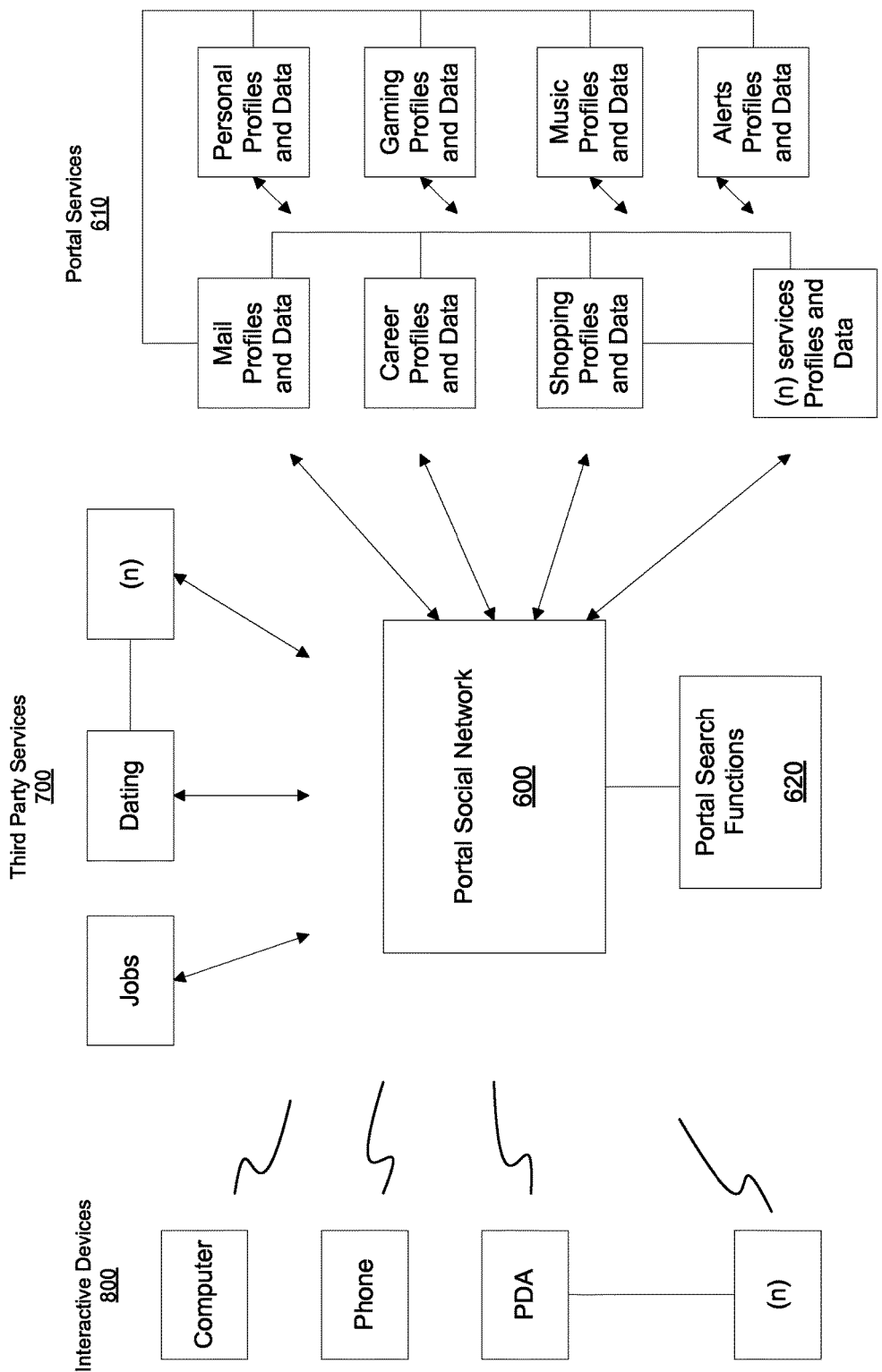
FIG. 6 is a schematic illustrating one embodiment of the present invention.

While a number of social networking (SN) systems have proliferated, none incorporate the advantages of utilizing information that can be found about a user in a portal environment. Specifically, portals are web destinations that offer numerous services and properties that provide the user with many opportunities to interact and assemble information about themselves through profiles, as well as through data gathering facilities of the portals and the portal's services. Also, portals have the ability to amass information about the user which is collected as user data. One principle advantage of implementing a social network application in a portal environment is that the numerous points of contact with the portal provide greater opportunity for the social network application to gather useful information about the members of the social network and greatly enhance the value and accuracy of the social network offering. Thus, with reference to FIG. 6, an exemplary portal environment for a social network offering is depicted. A portal social network application environment 600 is shown with interactive capabilities with multiple users via multiple interacted devices 800, such as, by way of non-limiting example, computers, wired and wireless phones, personal digital assistants (PDA) and any other interactive device now known or to be known in the future capable of interacting with a network computer application. The portal social network environment interacts at a software, hardware, and/or network level with the various portal services 610 such as, for example, email, career and job search, shopping, auctions, personals and gaming, and any other offering available through the portal in which a user can interact with the portal. Each of the portal services 610 becomes an interaction point with the social network environment 600 so that as a user creates a persona or multiple personas (e.g., work persona, dating persona, gaming persona, etc.) in the social network environment, the social network environment calls upon and utilizes information available through the various portal services that the user has interacted with and integrates that information into a useful whole. In this way, the portal-based social network environment can offer substantially improved social networking due to the enhanced data collection capabilities and opportunities for data collection and profiling that the portal provides for the end-user. Additionally, the portal social networking environment 600 may also interact with third party services 700 such as third party jobs or career search systems, dating systems or other third party services that the user may interact with and which may result in the creation of a user profile or a user data. The portal social network also integrates and/or has the ability to integrate this information using either "bot" or "agent" or screen scraping technology or by having the user authorize the portal, with appropriate password and security permissions, to interact with the third party services on behalf of the user to incorporate information about the user available on the third party services and make that information' available to the portal social network environment for enhancing the user's profile and network interaction.

Additionally, in a portal environment with a search function 620, the user has the ability to utilize the portal search functions which also provides an additional point of information for the portal social network 600 to gather information about the user. Additionally, the user may elect to have searches performed through the portal search function 620 filtered through the portal social network environment so that when a user, for example, is searching for information about a topic that is related or recognized by the portal social network environment as a topic that has been researched or investigated or interacted with by other members of the user's social network, the search result can be filtered through the user social network to increase the relevance of the search result. Thus, for example, a search for new "new movies" could yield a search result that provides information about new movies that other members of the user's social network thought were good new movies: The same concept applies to other portal services such as music or games enjoyed by "friends" network members, good business-related books read by members of a "work" network, and the like. Thus, it will be recognized from the teachings herein regarding the multiple opportunities for interoperability for a social network environment within a portal environment to yield much greater relevance to a social network user because the portal has much greater ability to gather information about the user and the other members of the user's social network.

In one embodiment, each user of the overall system is given a master ID, to identify themselves to the system. This master ID is an initial user name chosen by the user throughout the system. In one embodiment of the present invention, a profile is associated with the master ID. This profile can include information about the user and can be utilized by various different features of the overall system. While a master ID can refer to a specific user, additionally numerous users can be encompassed under one single master ID. For example, numerous people in one household may use the same master ID to identify themselves as a whole. In such a situation, aliases are set up within the master ID to refer to the different people using the master ID. For example, while a master ID can be referred to as the Smith family, each member of the family can have an alias (e.g., mother_Smith, daughter_Smith, son_Smith). This will allow one particular group of people to utilize a single master ID while retaining individuality between the users with each user's individual alias.

Within the social network, an individual user will be able to set up a profile which is associated with an alias. The user will select which particular alias he or she would like to have associated with the social networking profile. The social networking profile which can replace or complement any other files within the system and allows the user to concisely view a profile of any particular user thus enabling enhanced social networking.

In one embodiment, the social networking profile includes the following fields, each field being associated with a particular type of entry (e.g., textural string, URL, male/female), the type referring to the allowed entry for a particular field. Additionally, the different fields can have numerous values associated with the field as can be seen from the table below.

| Field | Type | # Values Allowed |
|---|---|---|
| Nickname | String | Multiple |
| First Name | String | One |
| Last Name | String | One |
| Birth Date | Date | One |
| Home Town | String | One |
| Location | Zip Code | One |
| Photo | Bitmap | Multiple |
| Gender | Male/Female | One |
| Description | Long String | Multiple |
| Relationship | Single/Married | One |
| Quote | String | Multiple |
| IM Addresses | String | One |
| Email Address | Email | One |
| Occupation | String | One |
| Work History | String | One |
| Interests | String | One |
| Home Page | URL | One |
| System Areas | URL | One |
| Schools | String | One |
| Organizations | String | One |
| Favorites | String | One |
| Industry | String | One |
| Military Groups | String | One |
| Military Divisions | String | One |
| Job Title | String | One |

The fields will now be discussed in more detail. Nickname, refers to a name selected by a particular user to identify themselves on the social network. Unlike the master ID or alias, the nickname need not be unique, and a particular user may have more than one nickname. The photo field can be populated by a bitmap picture of the user. This field is useful for associating a name with a face, thus allowing the users to actually view a picture of another user before actually communicating with them. In one embodiment, users will have the ability to upload more than one photo of themselves to the system. Users will upload one primary photo which is the picture that will be displayed to all users viewing this user's profile. However, users will also be able to upload additional photos which can be associated with a particular group of people defined by the user. It should also be appreciated that not all of the fields are mandatory and rather the user can be permitted to populate some fields while leaving others empty.

The description field is a field which is populated by the user to include a few sentences or paragraphs about the user. This description can be any sort of additional information which the user wishes to share with other users. For example, the description field might be populated with a paragraph describing what the particular user is looking for in the social network (i.e., seeking a single male who enjoys movies).

The quote field is a field which allows users to put in a quote which he or she feels is associated with them. This can range from a favorite quote to a popular quote, to any quote that the user would like to share with other users.

The IM addresses and e-mail address fields are populated by the user IM address and e-mail address respectively. This allows other users who are viewing the profile to view the user's instant messaging addresses and e-mail address to be able to contact the user.

The occupation and work history fields can be populated by the user to include information about the user's job as well as any work that he/she has performed in the past.

The interests field may be pre-generated by the system or may be formed by the user themselves. For the pre-generated interests field users select interests from a pre-generated list. These interests may include hobbies, movies, songs, or any other interest that a user may have. This allows users to associate themselves with a particular interest, thus allowing easier access at a later point to network with users with a similar interest. In a user-created interests field the users write in alternative user interests that don't fit into any existing categories in the pre-generated interests list. In one embodiment, the interests field, whether it is pre-generated or free formed, will appear in the user profile as a link. In other words, the user clicks on any one of the interests field which is a hotlink, and it will automatically generate a search for all other users who have listed that particular interest. Thus, a user will usually be able to compile a list of other users on the system with those particular interests.

The homepage and system areas field are populated with an URL which links users to that user's homepage or particular area in the system, respectively. A user may add these sites to his profile to allow other users to easily access either the user's homepage or other areas in the system which the user particularly enjoys or uses often.

It should be understood that the profile can include additional fields and that each field can contain various forms of information. The above-listed table and explanations only serve as an example of one particular embodiment of the present invention. It should also be appreciated that the fields in the profile can be automatically populated by the user by importing data from other parts of the system. For example, the system can import information already obtained by the system by another property of the system. For example, the below-listed fields may be populated from the below-listed properties:

| Source Field | Source | Target |
| --- | --- | --- |
| First Name | Wallet | First Name |
| Last Name | Wallet | Last Name |
| Zip Code | Wallet | Location |
| Email Address | Wallet | Email Address |
| Location | Personals | Location |
| Email Address | Personals | Email Address |
| Occupation | Personals | Occupation |
| Weather Location | My System | Location |
| Real Name | Profile | First/Last Name |
| Nickname | Profile | Nickname (public) |
| Location | Profile | Location |
| Age | Profile | Age |
| Gender | Profile | Gender |
| Occupation | Profile | Occupation |
| Photo | Profile | Photo (public) |
| Martial Status | Profile | Relationship |
| Hobbies | Profile | Interests |
| Favorite Quote | Profile | Quote (public) |
| Description | Profile | Description (public) |
| Home Page | Profile | Home Page |
| Cool Links | Profile | Favorites |
| Email Address | Profile | Email Address |
| Favorite Genres | Movies | Interests |
| In Your Own Words | Movies | Description (public) |
| Education | Personals | Schools |
| Interests | Personals | Interests |
| Additional Info | Auctions | Description |
| My Calendar | Calendar | System Areas |
| Movies Link | Movies | System Areas |
| Finance Link | Finance | System Areas |
| Groups | Groups | System Areas |
| My Classifieds | Classifieds | System Areas |
| My Resume | Job-Site | System Areas |
| My Auctions | Auctions | System Areas |

In one embodiment of the present invention, information and data to enhance the social networking experience can be imported from outside providers. For example, a user who has an account on another system may provide the user and password of the other account to the system and the system would incorporate that information to enhance a user's social network by updating their profile and of using the information to tailor the system's social network capabilities to the user's needs.

In one embodiment, a user who is setting up their profile will be able to select a particular activity or a particular goal that they wish to accomplish by using the social network. For example, some activities might include: 1) making friends on the social network; 2) using the social network as a source for dating; 3) using the social network to interconnect with alumni from the user's school; 4) using the social network to reconnect people who served together in the military; 5) using the social network to network within the user's career, by meeting people in similar professions who would learn about potential job openings; 6) using the social network to receive help and advice from the users who have a common interest. By selecting the particular purpose that a user wishes to use the social network for, the system will be able to more precisely tailor the profile to the user's needs.

The system also allows the user to set up a grouping of users that may or may not be able to view the user's profile. The user may wish that some other users view a particular field while other users not be able to view a particular field. For example, in one embodiment, users can set up categories of exposure which can include: 1) mandatory; 2) public default; 3) optional. The mandatory category would require a field to always be visible to all other users. The public default category would be set to default to publicly be available to other users, a user can however choose to hide these fields from other users. For example, the table below shows an exemplary list of particular fields and suggested exposure categories.

| Field | Exposure Category |
|---|---|
| Nickname (public) | Mandatory |
| First Name | Optional |
| Last Name | Optional |
| Age | Default Public |
| Home Town | Default Public |
| Location | Default Public |
| Photo (public) | Mandatory |
| Gender | Mandatory |
| Description (public) | Default Public |
| Relationship | Optional |
| Quote (public) | Default Public |
| IM Addresses | Optional |
| Email Address | Optional |
| Occupation | Optional |
| Work History | Optional |
| Interests | Default Public |
| Home Page | Optional |
| Areas | Optional |
| Schools | Optional |
| Organizations | Optional |
| Favorites | Optional |
| Industry | Optional |
| Military Groups | Optional |
| Military Divisions | Optional |
| Job Title | Optional |

Additional criteria for displaying fields might be the relationship one has with the user. As will be explained in more detail later, different users may have different relationships with each other and different levels of relationship, fields in the profile may be displayed based on a particular relationship.

In order to better establish a social network for users, categories can be set up to define the relationship between individual users. Categories can establish a classification for a group of users in an individual user's network (e.g., friends, co-workers, family). Individual users can define their own categories.

Before establishing categories, a relationship should be created between individuals. Different degrees of relationships can be created between individual users and tracked by the system. For instance, if one user invites another user to join his network that would create a first degree relationship. For example, if user A invites user B to join user A's social network, then user A and user B will have a first degree relationship. If, user B then invites user C to join user B's network, although user A and user B have a first degree relationship and user B and user C have a first degree relationship, user A and user C would have a second degree relationship. Thus, the degrees of relationship are relative to the closeness between the users.

Categories can, therefore, be set up to users who have a particular degree of relationship to each other. For example, categories would be most helpful for users who have a first degree relationship to each other. Thus, users have the ability to rate those users that have a first degree relationship that are in a particular category. Categories can also be used to control which information or fields might be viewed by members of a category, or to efficiently communicate with all members of the category. For example, if a user establishes a business category for all users that are in a first degree relationship with the user who are also business contacts with the user, the user might wish to hide some personal fields from his profile from all these business users. Alternatively, the user may use the category to send out a e-mail or instant message to all members of the category at once. Thus, it should be appreciated that the grouping of users into a category provides a more efficient way of managing relationships as well as a simpler way of allowing a user to disseminate information to all first degree users that fit certain criteria. Users can define their own categories as well as choose from predefined categories pre-selected previously by the system. Initially, users can be assigned to more than one category or alternatively cannot be assigned to any category. This, a user is given the ability to categorize his first degree contacts as narrowly or broadly as he or she wants. For example, one user may be classified in numerous categories (e.g., friends, soccer teammates, co-workers, family) while another user although in a first degree relationship with the first user may be classified under no categories. The user also has the ability to change the category that another user belongs to at will. This would be useful if the person's status changes or if the user just wishes to change a user's category. Additionally, users have the ability to customize fields within their profiles by category. For example, a user may show a particular photo to his friend while he or she may show a different photo to his business acquaintances. A user will set up permissions based on the category which define what each user in each category will be able to view in the profile.

In one embodiment, users will be able to view a list of user's related to him in the first degree. The list would include each user who has a first degree relationship as well as a nickname, photo and category assignment. Alternatively, the list can include other fields from the user's profile. The user of the system will also be able to list a list of users by category. For example, in addition to being able to view a list of all uses who have a relationship with this particular user, a user will be able to view a list of all users who belong to a particular category. For example, users may wish to list all users that belong to a particular category or group of categories and will be able to view them all in one aggregated list.

Additionally, users will have the ability to preview their profile in the way that other users will be able to view it. For example, if a user sets particular permissions for different categories within their profile, he or she will be able to view the profile in the same way that another user belonging to a particular category will be able to view it.

The user of the system will also be able to set and control what kind of messages they receive from people within the network. For instance, a user can define which users he or she would like to receive invitations to join the social network from, which users he or she would like to receive e-mail messages or instant messages from. A user in the system would be allowed to set a security level of what messages and/or invitations he or she would like to receive. In one exemplary method, a zero degree tolerance would mean that the user wishes nobody to be able to send or initiate a message to them. A first degree security level would mean that only friends (i.e., users that a user has invited to join his or her network) can send messages to the user. A two degrees security level would mean that both friends on a first degree level and friends of those friends could send messages. A three degree security level would mean that those friends, and friends of friends, as well as friends of friends of friends could send messages to the user. Alternatively, the user may set a security level of open to all, which means that the user would be allowed to receive messages and/or invitations from any person on the system. In one embodiment, the system sets a default level of three degrees for a user, this level being able to be changed by the user themselves.

A way in which the user establishes a social network will now be explained in more depth. The user can invite another user to join their network by sending an invitation to another user. For example, user A invites user B to join user A's network. While user A might be acquainted with user B, it is possible that user A does not know user B and rather happened upon user B's profile while searching the system. In one embodiment, an activation button will be set up on a user's profile page to allow anyone viewing the user's profile page to instantly invite the user to his or her network. It should also be understood that if the security settings are set in a way that the user does not wish to receive invitations, the activation button will not appear.

If a user who wishes to initiate an invitation knows the e-mail address of that person who he or she wishes to initiate the invitation to, an invitation can be directly sent to the invitee's e-mail address. Such an invitation can be sent whether or not the users are in each others networks. Once an invitation to join a network is received by another user, the user receiving the invitation has three choices. The first choice is to accept the invitation. If the invitee decides to accept the invitation, the system automatically includes the invitee in the inviter's network as a first degree relationship and vice versa as well as sends a confirmation e-mail to the inviter indicating that the invitee has accepted the invitation. The invitee is then given an option to assign a category to the new user in their network. Similarly, from within the confirmation email, the inviter is given the option to assign the invitee to one of his or her categories. In one embodiment, as a default the users are assigned to an unassigned category. The second option, to the invitee is to reject the invitation. If the invitee selects this option, then the system generates a standard rejection message which is sent to the inviter informing him or her that the invitation has been rejected. Alternatively, the invitee is able to customize his particular rejection message. The third choice of the invitee is to ignore the invitation. In this situation, the invitee simply does not respond to the invitation. He or she can delete the invitation or just leave it in their inbox. Invitations can also expire after a set amount of time, either set by the inviter or by the system. Thus, if a user chooses to ignore an invitation, that invitation will count as an outstanding invitation until it expires.

According to one embodiment of the present invention, track is kept of refusals of invitations. The system monitors the amount of invitations that have been issued by a particular user and the amount of invitations that have been rejected by other users. It should be appreciated that this will enhance the system in being able to keep track of users who merely send out invitations without any knowledge of the user they are sending it to and with the clear intention of just annoying other users. An algorithm can be applied to the data obtained about invitation refusals in order to create an efficient tracking of the invitation refusals. An exemplary algorithm calculates that if the number of refusals is greater than or equal to X % of Y invitations, where Y is the maximum number of invitations that the system allows to be outstanding at any given time per user, then that user will only be allowed to have one invitation outstanding at a given time. The system can also notify the user once their rate of refusal passes a particular threshold. For example, if a user's refusal percentage is bordering on the percentage allowed by the system, the system sends a notification e-mail to the user alerting him that if X % more of his invitations are refused, the user will only be allowed to retain one outstanding invitation at a time.

In one embodiment of the present invention, web forms can alternatively be used to input data about the invitee into the system. For example, when an invitation is sent out by a user, instead of accepting or rejecting the invitation directly by email, the invitation can include a link for the invited user to click onto. Once the user clicks on that link, the invited user is directed to a web page where he or she can enter any relevant information about themselves. It should be appreciated that in such an embodiment, the system is not responsive to and does not wait for any particular email message regarding the acceptance or rejection of an invitation but instead the system is responsive to information entered in the web form which may be separate from or the same as the system's general web page. Additionally the system keeps track of the information that is entered in the web form and considers the invitee's choice to go to the web page as an acceptance of the invitation. Alternatively the system may wait till the invitee submits his or her information before considering the invitation to have been accepted. It should be appreciated that such an embodiment provides the added benefit of allowing a user that is invited to join a social network to first see what information will be requested of them before agreeing to accept the invitation.

Another way to send an invitation to a user is by using the master ID. This provides the ability for a user to invite another user who does not belong to the social network system, but rather belongs to the general system as a whole. In this situation, an invitation is sent to the other user asking him to join the network system as well as the inviter's particular network. In the sequence of events in this situation, is that the invitee receives an e-mail requesting that he or she join the overall network system. Once the invitee has decided to join the network system and has to follow through on all the steps required to join the system, the invitee will then be asked if he or she wishes to invite the inviter to join her network as a first degree relation. If the invitee declines, then the sequence ends. If the invitee accepts though, then the system will automatically include the inviter in the invitee's first degree relationship as well as automatically generating an e-mail to invite the inviter to join the invitee's relationship. Inviter is once again given the choice of accepting this invitation, rejecting this invitation or ignoring it.

A user is also able to invite another user who is not a member of the overall system by merely sending the invitation to the invitee's outside e-mail address. In this situation, an invitation is sent to the outside e-mail address and the invitee is invited to join the overall network. Once the invitee has joined the overall network, he or she is directed to join the social network. Once he or she has joined the social network, the inviter is immediately added to the invitee's first degree relationship and an e-mail is sent back to the inviter inviting him or her to join the invitee's network. Once again, the inviter can accept, reject or ignore the invitation. The steps carried out in such an invitation is to first ascertain that the invitee is a member of the overall network and, if so, have the invitee log onto the network. At that point, the invitee will be invited to log onto the social network. Once the invitee has joined the social network, he will be included in the inviter's first degree relationship and then the process will continue as described above. If the invitee is not a member of the overall network, he will be asked to join and once he joins the overall network, he will be asked to joint the social network and will be included in the inviter's first degree relationships.

In one embodiment, the system is able to track an e-mail address and associate it with a user of the social network without the user's social network providing it. If an invitee attempts to respond to an expired invitation, he or she will be directed to an error message page indicating that the invitation has expired. The inviter will then be notified that the invitee attempted to respond to an expired invitation. That way the inviter can resend the invitation to the invitee.

Users of the system are also able to invite other users who have different aliases associated with their master ID. These aliases can be associated to an instant messaging account or to any other property on the system. Additionally, the system allows the user to invite other users who are contacts within the user's e-mail address book. Any contacts within the address book who have valid e-mail addresses can be invited automatically to join the user's social network. The system is also able to track outstanding invitations to limit the amount of outstanding invitations at one point. For example, the user may be only allowed to have 100 outstanding invitations. An invitation is defined as outstanding from when it is sent by the inviter until the point it is accepted or rejected by the invitee. If the invitee decides to ignore the invitation, then it will still be viewed as outstanding. A user will also be allowed to view the number of outstanding invitations that he or she has at one particular point so that he or she may be able to keep track of which invitations he or she has sent and how close they are to filling their quota. In one embodiment, the system might send a notification message in the form of an e-mail message or instant message to the user notifying him or her that their outstanding invitation limit is approaching.

Additionally it should be appreciated that invitations can be standard messages or can include as little or as much information as the inviter wishes to include. For example, an invitation can be a generic message and then lead the invitee to a web page or to a web form to find out or fill out more specific information. (e.g., "You have been invited to join a social network, click below to find out more"). Alternatively the invitation can be more specific and include the name and or relationship of the inviter, (e.g., Your brother-in-law Joe Smith wishes you to join his social network"). It should be appreciated that the system can be adapted to include additional information or to remove the necessity for certain information so that each individual user can feel comfortable with the amount of information that they need to submit or solicit.

Users are also given the ability to send an auto-generated e-mail message to another user within their first degree relation. This e-mail alerts the other user of a user that has been found in the system that matches certain criteria. Therefore, if while searching through the system, user. A uncovers user C's profile, which he finds interesting, he may automatically send an e-mail message forwarding user C's profile to any user that is within user A's first degree relation. Additionally, a user can bookmark another user's profile to be able to easily return to it at a later point. The user can also view his or her bookmarks and from that list of bookmarks be able to link to any of the bookmarked profiles. Once a profile has been bookmarked, the user can allow different permission levels for different categories to be able to view the bookmarked profiles. Thus, the user may bookmark a certain number of profiles and allow his friends category to view those bookmarked profiles while not allowing his professional category to view those profiles. Additionally, each user can activate an "ignore" feature to ignore any user on the system. Once this ignore feature is activated, any communication emanating from this ignored person will not be seen by the user initiating the ignore feature.

The user within the network is able to search through other users' profiles to help build the network, message to individual users or group of users, plan an event, or just merely browse through profiles. When a user initiates a search, results will be displayed which respond to the search criteria. The system can set a specified number of results that are displayed for the search. In addition to searching other users' profiles, a user may be able to search invitations to see which users have invited which other user's to their network. This search can be initiated by a user name, or, alternatively using other criteria such as location or interest. It should be understood that this will result in enhanced ability for a user to see inter-relationships between other users who might have similar interests to them. Additionally, users may search categories, networks, or all users of the system that they wish to interact with. In order to avoid a search which would return all users in the database, some of the search criteria must be set by the system. An example of criteria which can be set for the search is displayed in the table below.

| Criteria | Type | Default Value |
| --- | --- | --- |
| People with photos | Boolean | Set |
| First name | Text | [no value] |
| Last name | Text | [no value] |
| Email | Email | [no value] |
| Interest | Text | [no value] |
| Gender | M/F/[no value] | [no value] |
| Age | Integer | [no value] |
| Intent | List | [no value] |
| Limit search to | All/In my Network/In selected Categories | In my network |
| Distance from me | Anywhere/State/ 100/50/25/10/5 miles | 25 miles |
| Nickname | Text | [no value] |
| Home Town | Text | [no value] |
| Relationship | Married/Single/ [no value] | [no value] |
| Occupation, Work History, School, or Organization | Text | [no value] |
| Favorites | Text | [no value] |

In the above listed table, the criteria represents criteria for a search, while the type indicates the type or value necessary for the search, while default value is an example of an exemplary value type for the value type criteria.

In another embodiment, the user may search based on a particular activity, and the system populates the fields necessary to search based on that activity. For example, in the table below, activities are set out alongside the field that the system would search to establish those activities.

| Activity | Searched Fields |
| --- | --- |
| Friends | Location, Interests |
| Dating | Location, Interests, Age, Gender, Relationship |
| Alumni | Schools, Organizations |
| Military | Schools, Organizations |
| Help & Advice | Interests |

The above listed table explains, for example, that if a user wishes to search an activity such as dating the system will match up profiles that match the user's location and interests with an approximate age that will match the user with the opposite gender, as well as a relationship to allow the user to interact with the other user.

In one embodiment, an introduction can be arranged between two different users. For example, if A is related to B and B is related to C, but A, due to security or permission restrictions, cannot send an invitation to C, A can in the alternative request introduction to C via B. The system will allow users to set up a category permission for introductions, which will either allow people to take introductions to them or not and will allow a user to accept introductions or not. In order to facilitate the introduction, when user A notices user C's profile and wishes to be introduced by a common first degree relative B, user B is notified of user A's intention and user B is requested to make the introduction. When user B receives the introduction request, they can either accept it and forward the introduction to user C, possibly adding additional text explaining the relationship between user A and user B. In the alternative, user B can delete or ignore the invitation request or if he or she chooses, user B can decline to complete the introduction and reply to user A with possible additional, text explaining the reason for declining. Once an introduction reaches the target, it is treated as an invitation and the invitee or introductee can then proceed to accept, decline or ignore the invitation.

Within the social network, an area is, provided for the user to receive and send social network specific messages. This area is used for such things as invitations, introductions, invites from other users to chat or testimonial submissions as will be explained later. When such a message or notice is received by a user in this specific area, links are provided to the user to act upon those specific requests, such as replying to an e-mail or accepting or rejecting an invitation. Additionally, users of the social network will be able to send and receive e-mail messages to other users in their network. These e-mail messages can be sent to individual users, to multiple users whether or not these users have been grouped into a category.

An e-mail message specific to the social network will now be discussed in more detail. In a preferred embodiment, the format of the e-mail will include the sender's nickname, and additionally, the, sender's photo within the message so that it is clear to a user receiving the message from whom the message was sent. Additionally, the sender of the e-mail should have the option of revealing or not revealing to the sender other users that have received the e-mail. This, of course, will provide the added benefit of allowing the user to send e-mail to numerous people and keeping the recipients of the e-mail confidential. Alternatively, a user might wish to show other users who the e-mail message was sent to. Other features of this social network specific e-mail include standard features of regular e-mail including drafting messages, editing messages, saving draft versions of messages, forwarding messages, and replying to messages. Additionally, these e-mail messages might have a specific expiration date. For instance, after a certain amount of time (e.g., 120 days), the message can expire. Another feature of these e-mail messages is that users will be able to view messages in a summary view, meaning that a user will be able to view all sent and received messages in a summarized fashion or a category, or by sender or by subject, or other criteria.

A user of the social network will also have the ability to send instant messages to other users of the network. This is provided by integrating an instant messenger program with the social network. This integration will allow users who are in the network the ability to send instant messages to one or many users within the network. This is accomplished by allowing users who have access to instant messaging programs on their system to send and receive messages from within the social network to other users within their network. Similar to the email message feature, users have the ability to send an instant, message to one or many other users within their network whether or not those users are grouped into a category.

Another feature of the social network is allowing users to invite other users to a chat room. This feature provides integration between the social network and chat room capabilities. Users within the social network have the ability to send invitations to other users to join a chat room. These invitations can be sent to one or more users, whether or not the users are grouped in a category. In one embodiment, permission levels will be set by the user to, determine whether or not they will allow other users to invite them into a chat room. Once invited, a user who accepts such an invitation will be transferred to a chat room where they can converse with other users in the chat room. As is well know in the art, a chat room environment allows numerous users to exchange messages within the chat interface visible to other users in the chat room. The chat invites will be delivered to the user's message box where he or she will be able to join an ongoing chat. In the alternative, a user may decide to initiate a chat room at a certain time and may send out invitations to other users to join him in the chat room at that time. It should be understood that this allows the user to have more control over including other users within his or her chat experience. Similar to e-mail messages and instant messaging, the user has the ability to invite members within a particular category all at once to participate in a chat room. In such an example, the from field would be the user's nickname, while the to field would be the category of users that he wishes to invite. Once again, a user may choose to reveal or choose to hide other users that have been invited to the chat room. In another embodiment, users might have the ability to invite all members of a particular category excluding certain members (e.g., send the invite to all but two of my co-workers).

The system also provides the ability for a user to be alerted when he or she receives new messages, invitations, or e-mails. Users can choose to receive alerts in numerous ways. One way the system alerts the user is by alerting the user every time a new invitation, message or other communication is sent to them. A second way is by sending a message to the user once a day including a digest summary of all communications received the entire day. Alternatively, the user can decide not to receive any notification and instead visit the system at his or her convenience in order to check for any communications. Alerts from the system can be sent in a variety of ways including e-mail, instant message, SMS or any other communication media as is known in the art. Additionally, a user can choose to be alerted by the system when another user updates his or her profile.

As discussed earlier, a user will be able to post a photo of themselves into the profile. The user is able to upload photos onto the system and post those photos off their profile. In one embodiment of the present invention an integration is formed between a photo program within the overall system and the social network. For example, if the system contains a feature wherein a user is able to store different photos on the system, the social network system will allow the user to seamlessly integrate those photos to the user's profile. Once a photo is uploaded onto the social networking system, users will not be able to edit or alter the photo. Users will however, be able to attach a caption or other distinguishing characteristics to the photo. The system, however, can have an additional program available to the user which allows users to edit, print or otherwise manipulate photographs. Thus, a user will be encouraged to use other features within the system to, for example, maximize their photographs.

In another embodiment of the present invention, users may provide testimonials about another user. In other words, one user may vouch for the other user as a friend or an acquaintance. In operation, one user may initiate a request to create a testimonial about another user. The user about whom the testimonial is being created will have the option to set permission levels as to whether to allow other users to create testimonials about him or her and whether specific users can create testimonials about him or her. Once a user is permitted to create a testimonial, a user will be given the ability to submit a paragraph or so about the user. Once the testimonial is submitted, the user about whom the testimonial has been written can be alerted that a testimonial has been submitted about them and can review the testimonial for his or her approval. Once the testimonial has been approved, it can be posted to the user's profile and viewable to all those the user has permitted to view the testimonial. If the user decides to reject the testimonial, an e-mail should be sent to the user who created the testimonial stating that the testimonial has been rejected. The user may customize the e-mail to include information about why the testimonial has been rejected. Alternatively, if the user decides to ignore the testimonial as it has been submitted about him or her, it will just remain as a message in the user's inbox. Similar to an invitation, a testimonial can expire after a certain amount of time. When a testimonial is displayed in a user's profile, alongside the testimonial the nickname of the user submitting the testimonial as well as a picture of the user is displayed. The ability exists for the writer of the testimonial or the user who the testimonial is about to delete the testimonial as well and have it no longer displayed.

Another feature of the social network is allowing the user to create a journal to post together with or separate from their profile. The user can include messages in their journal which are then categorized by time and date. Other users can then respond to entries in the journal or post comments regarding the entries. Once again, comments can only be provided if permission is granted by the user whose journal is being commented on. The ability also exists to transfer journal entries from other parts of the system to the social network system.

Additionally, users can create and join different groups based upon the system's group category. Such results will allow users to use or join groups in other parts of the system.

The system has the ability of allowing users of the overall system to provide recommendations for different items including movies, products, or other things. Although these recommendations are usually made by aliases, these recommendations can be made within the social networking system between users of the social network. For example, a list may be displayed of items previously recommended by the user and this list can be displayed to other users of the social network, Additionally, a user might be able to display advertisements or other news that they wish to broadcast to other users within their profile page. In another embodiment, users may also include events and dates and locations of specific meetings, whether or physical or virtual meetings, which they can broadcast to other users as well.

In one embodiment, the profile display will also include a link to allow users to report abuse of the system to system operators. It should be appreciated that in such a wide ranging system users of the system may take advantage of the far reaching abilities of the system to post, for example, offensive language in their profile or other areas. This button will allow users to report such abuse so that system operators will uncover any abuse of the system or improper use of the system sooner than they would have otherwise. Additionally, in order to avoid abuse of the system, any pictures that are posted in a profile will be first reviewed by the system operator before they are posted. Additionally, other forms of tracking abuse that are well known in the art are used in the system to weed out users who are improperly using the system or improper uses (e.g., spammers and pornographers).

A brief overview of feature sets for one embodiment of the present invention is displayed below.

| Component and feature sets | Definition |
|---|---|
| User Profile | |
| Edit/Add | Should include name, birth date, gender, location, marital status, photos, quote, interests, work history, homepage, URLs, blog links, links to other areas (calendar, groups, profiles, favorite chat rooms, favorite movies ratings, my reviews, my member interests, my photos). Adding a profile requires email authentication of the owner. |
| Status | Pending add friend requests, pending testimonials, pending messages, recent friend activity, alerts. |
| View (public view) | Friends path (degrees of separation), add/remove from network, photo, avatar, ASL, quote, interests, URLs, testimonials, blog (journal), poll. |
| View (friends view) | Broad categories should have privacy toggles so some friends could get access to this info while other friends would not. Data types: friends of this friend, detailed contact information, work history, blog, photo gallery, testimonials. |
| Multiple views | Allow users to segment or customize their profiles for different audiences (e.g., Work Colleagues, Friends, Family, Dates). |

-continued

| Component and feature sets | Definition |
| --- | --- |
| Preferences | Expose contact information to different groups of people, blog (public read/comment), polls (public read/comment), photos (public view/add), alerts delivery mediums (email, IM, SMS), alert types (buddy requests, new posts or testimonials). |
| Building Network | |
| Invitations | Email invitations can be sent to any user which contains link to join and to add as friend. Maximum number of outstanding invitations to prevent spam. In future versions, invitations can be sent to Master ID if on existing Messenger buddy list. |
| Adding from Network | Requires entering first and last name, email address or ID to send invite to add person to buddy list. Users can opt to automatically accept new invitations or add requests. Allow ability to organize additions based upon profile category (e.g., work, family, friends. |
| Import from Messenger | Provide interface to import or add existing buddies (either individually, as. Messenger groups, or all) to individual's network. Notification is sent to the buddies that they've been added, encouraging them to create their profile and they can opt-out. Messenger reflects social network member status. |
| Import from Groups | Provide interface to easily send invitation to join social network to members of Group if user is a member, too. If users opt-in, provide interface to automate process. Setting controlled via Groups and/or the social network interface. |
| Import from Address Book | Provide interface to easily send invitation to join social network to those in Address Book. For those with Master ID, first name, last name and email address, consider allowing direct add to social network with reactive opt-out. |
| Import from Mail | Provide ability to scan Mail activity to determine most popular people messages are sent and received from, and allow owner to easily send invitations to those recipients to join network. |
| Forward to Friend | Give users easy ability to send an auto-generated email alerting them to a person they found interesting. |
| Bookmark | Ability to bookmark profiles of people that are interesting. |
| Ignore/Flag for Review | Ability to ignore any person on the network. Potentially customize so that you may ignore person, but not their connections. Ability to report an individual who is violating TOS. |
| Rating | People have the ability to provide a rating on other people in the network based on relevance or interest. That rating will impact how future search results will return people. (if someone isn't relevant, they'll come up lower in future searches). The person being rated has no visibility to the rating. Rating should not be positioned as hot or not. |
| Searching/Matching | |
| Search Network | Provide ability to search or interests, first and last name, email address or Master ID. Refine searches based on geography if interested. |
| Browse Network | Provide ability to browse network based on specific criteria. |
| Matching | Based on profile, interests, searching criteria, suggests matches for friends, hobbies, groups, or business networking. |
| Introductions | Ability for users to seek introductions to friends or specific people on a current friend's network. |
| Publishing | |
| Photos | Add/delete photos and description (should be one picture on central profile that must be personally identifiable. Other non-adult pix may be uploaded to user's personal area). Should tie in with Systems Photo feature. Future versions allow friends to add their own pictures to your collection. |
| Testimonials | Friends may write testimonials for other friends. Those testimonials are subject to approval by owner. Those testimonials may be deleted by owner or recipient at any time. |

| Component and feature sets | Definition |
| --- | --- |
| Blog | Owner may write basic journal for their profile. The journal entry does not allow for complex HTML, but will have a rich HTML post. Posts will be scanned for spam reactively. Blog should also allow comments from friends in reaction to posts. May integrate RSS feeds. |
| Groups | Allow users to create and join groups based upon Groups category structure and interest matching. |
| Recommendations | Allow users to make recommendations on products, movies, restaurants, services, et al. Allow users to filter based upon their network. Future versions integrate with Yellow Pages, Map[s, Shopping, Media, Entertainment, Information, Finance, et al. |
| Communications | |
| Personal messaging | Allow users to contact mutual friends via IM, SMS, social network message (on-site email), or potentially subscription mail service. Users can determine whether they want to receive such messages from their preferences. |
| DegreeMail | Send message to all those in my immediate network. Potentially extending to first degree. Allow owner to segment network by groupings (e.g., only people I've designated as "work" contacts). |
| Listings | Allow users to list items or services for sale, purchase or hire. Will integrate with Classifieds in future. |
| Events | Allow users to list events. Integrate with Calendar. |
| Homepage | |
| New members | New members in the network who are relevant to what someone is looking for should be featured at the top. |
| Alerts/Status | Updates and alerts with pending activities. Also lists size of personal network, and people within associated degrees of connection. |
| Recent Activity | Activity updates on what friends have done (added new friends, new testimonials, new profile information). |
| Friend watching | Ability to monitor specific friends in immediate network and new pictures they upload, new friends they add, etc. |
| Tips/Advice | Instructions for what to do next. |
| Quick Start | Ability to initiate messages with friends or groups of friends from homepage. |
| Abuse/Moderation | |
| Profile picture review | Ability to review primary Profile picture and reject. |
| Profile review | Ability to review flagged profiles and take action. |
| Message/Link/Blog content review | Ability to monitor user-generated content for suspect TOS/spam violations. |

A description of an exemplary functionality according to one embodiment of the present invention will now be explained.

The following terms are used throughout this description in defining/describing Social Networking (SN) functionality.

Yahoo ID—The root ID and initial username that a user registers with on Yahoo!

Yahoo! Alias—One of multiple different usernames that may be associated with the original Yahoo ID. A user currently may have up to six additional aliases for a single Yahoo ID. The alias has most of the same capabilities as a Yahoo ID except that it cannot be used to receive email for a Yahoo Mail account.

Yahoo Profile—The current Yahoo Profiles service, which displays information on a specific alias.

SN Profile—The proposed user profile for a SN user, which would replace the Yahoo Profile for that specific user Yahoo Alias.

Nickname—The name that SN users select to use to identify themselves on SN. This name is not unique (i.e., other SN users may have the same Nickname". Note, SN users may have more than one Nickname.

User—A person who has established a profile on SN.

User Categories—A classification for a group of users within an individual SN user's network (e.g., friends, co-workers, family). SN users can define their own categories.

SN Activities—The ways that a SN user intends to use the SN network (e.g., for making new friends, dating, etc.).

User Interests—Represents the hobbies, interests or affinities for SN users.

First Degree—Those individuals who join a particular 'SN user's network after receiving an invitation from that SN user. They are directly connected to that SN user.

In Network—Those individuals who are within three degrees (or less) of a SN user. That would include friends (people whom the SN user invited to join his/her network), friends of those friends, and then friends of those friends' friends.

| | 1. User Profile |
|---|---|
| Requirement | Description |
| | SN Profile |
| Profile - Yahoo ID association | The Social Network (SN) profile is associated with a single Yahoo! alias. The user can select which Yahoo! alias (primary or secondary) that he/she would like to have associated with his/her SN profile. This alias is not the name of the SN profile. |
| Profile format | The SN Profile format will replace the current Yahoo Profile format for a specific alias and will be displayed at profiles.yahoo.com. The existing (or legacy) Yahoo! Profiles will be unaffected by the new SN formatting, although there will be a link and possibly promotional content that will appear on profiles pages encouraging users to create a new SN Profile. Preferably Users cannot maintain an existing Yahoo! Profile with the same alias that's being associated with a new SN profile. (in other words, there is only one user-facing web page per alias - it will either be the legacy Yahoo Profile or SN Profile). |
| Email verification | Adding a profile requires email authentication of the owner. This valid email address is used for all SN notifications. |
| | SN Profile Fields and Editing |
| Editable fields | This is the initial set of SN profile fields that are editable. They are exposed or hidden to other users, based on categories established by the user. (See Network requirements for details on categories and how they are established.) Users can add only one value for most fields in the SN profile. (Example: Only one First Name or Last Name allowed per Profile.) However, users should be able to add multiple values for some fields (For example: users can have multiple Nicknames) and then be able to select which value they would like exposed to other users, based on categories that the user establishes. |

| Field | Type | # Values |
|---|---|---|
| Nickname | String | Multiple |
| First Name | String | One |
| Last Name | String | One |
| Birth Date | Date | One |
| Home Town | String | One |
| Location | Zip Code | One |
| Photo | Bitmap | Multiple |
| Gender | Male/Female | One |
| Description | Long String | Multiple |
| Relationship | Single/Married | One |
| Quote | String | Multiple |
| IM Addresses | String | One |
| Email Address | Email | One |
| Occupation | String | One |
| Work History | String | One |
| Interests | String | One |
| Home Page | URL | One |
| Yahoo! areas | URL | One |
| Schools | String | One |
| Organizations | String | One |
| Favorites | String | One |
| Industry | String | One |
| Military Groups | String | One |
| Military Divisions | String | One |
| Job Title | String | One |

| Requirement | Description |
|---|---|
| User Interests (pre-generated) | Users may select interests from a pre-generated list. Initially, we suggest that SN feature the current interest categories (from the member directory), modified to include the proper names of performing artists, films, etc. from various Yahoo! databases. |
| User Interests (free form) | Allow users to write in alternative user interests (via free form text entries) that don't fit existing categories. |
| User Interests Hot Links | User interests (pre-generated and free form) will appear in user profile as hot links. That is, if a user clicks on any one of these hotlinks it will automatically generate a search for all SN users who have listed that interest. |
| Primary profile photo | Users will have the ability to upload one primary photo that visually represents them to their SN profile. This picture will be displayed to all users viewing the user's SN profile. Photos are not mandatory, but are encouraged. |
| Secondary profile photos | Users will have the ability to upload multiple photos and associate each photo(s) with a particular category, defined by user. (See Network requirements for details on category photos.) |

-continued

| 1. User Profile | |
|---|---|
| Requirement | Description |

| Pre-population of SN Fields | |
|---|---|
| Field import from user activity on Yahoo Network | Users will have the ability to import data from other parts of the Yahoo Network into their SN profile. The only fields that will be present, by default, when they first set up their SN profile and associate with a Yahoo! alias will be the previously existing fields shown on their old Yahoo Profile.<br>Users will have the ability to choose by field which data they want imported into their SN profile.<br>Users will have the ability to override (delete and reenter) all imported data.<br>Potential import fields are listed in priority order: In cases of conflict (and the SN profile field is empty), the Source closest to the top of the list will be used. If there is already a populated SN field, the current value will have priority over the potential import value.<br>Items marked with an "*" indicates instances where the imported data is a link (URL) to a user's public-facing Yahoo! application (e.g., My Photos, My Calendar, My Groups)<br>Fields to import:<br>Fields to import:<br>Source Field     Source     SN Target<br><br>First Name     Wallet     First Name<br>Last Name     Wallet     Last Name<br>Zip Code     Wallet     Location<br>Email Address     Wallet     Email Address<br>Location     Personals     Location<br>Email Address     Personals     Email Address<br>Occupation     Personals     Occupation<br>Weather Location     My Y!     Location<br>Real Name     Profile     First/Last Name<br>Nickname     Profile     Nickname (public)<br>Location     Profile     Location<br>Age     Profile     Age<br>Gender     Profile     Gender<br>Occupation     Profile     Occupation<br>Photo     Profile     Photo (public)<br>Marital Status     Profile     Relationship<br>Hobbies     Profile     Interests<br>Favorite Quote     Profile     Quote (public)<br>Description     Profile     Description (public)<br>Home Page     Profile     Home Page<br>Cool Links     Profile     Favorites<br>Email Address     Profile     Email Address<br>Favorite Genres     Movies     Interests<br>In Your Own Words     Movies     Description (public)<br>Education     Personals     Schools<br>Interests     Personals     Interests<br>Additional Info     Auctions     Description<br>* My Calendar     Calendar     Yahoo! Areas<br>* Y! Movies Link     Movies     Yahoo! Areas<br>* Y! Finance Link     Finance     Yahoo! Areas<br>* Y! Groups     Groups     Yahoo! Areas<br>* My Classifieds     Classifieds     Yahoo! Areas<br>* My Resume     HotJobs     Yahoo! Areas<br>* My Auctions     Auctions     Yahoo! Areas |

| Profile Purpose and Goals | |
|---|---|
| Selecting SN Activities | Provide ability for user to identify his/her intent for using SN network. Application or web, property, leveraging SN functionality, can set the SN activities that will be supported. For the initial release of SN, we are proposing that we support the following SN Activities:<br>1. Friends - I am interested in meeting new friends<br>2. Dating - I am interested in meeting people to date<br>3. Alumni Networking - I am interested in meeting/reconnecting with people from my graduating class or from my school<br>4. Military Networking - I am interested in meeting/reconnecting with people from my military unit<br>5. Career Networking - I am interested in meeting people in similar professions or to learn about potential job openings |

1. User Profile

| Requirement | Description |
|---|---|
| | 6. Help & Advice - I am interested in receiving help and advice from SN users who share my interests<br>Users can select as many SN Activities as they wish.<br>All users will have the Friends Activity turned on as a default. Users can override.<br>The SN Activities a user selects should be displayed in his/her profile. |
| Establishing Network Intent | Provide ability for user to identify his/her intent for using the SN network. SN, or application or Web property leveraging SN functionality, will determine those fields that must be displayed for a given intent selected. For instance, if user stated intent was to engage in career networking than application may require that user's occupation and work history must be displayed in profile. |

Profile Viewing

| Requirement | Description |
|---|---|
| Viewing Profile Data Fields | Users can define what profile fields are exposed to a browsing user, based on the browsing user's relationship with the user and the preferences the user has established for that category of user. (See Network requirements for more details on how users create and establish categories.)<br>Categories of Exposure include:<br>Mandatory - These fields are always viewable to all browsing users, even those who are not currently logged into Yahoo! In no instance can these fields be hidden.<br>Public Default - These fields are defaulted to be turned on for all browsing users, even those not currently logged into Yahoo! The user can choose to "turn off" these fields and hide them from all browsing users.<br>Optional - These fields can be hidden or exposed to different categories of users based upon the permissions that the user establishes. |

| Field | Exposure Category |
|---|---|
| Nickname (public) | Mandatory |
| First Name | Optional |
| Last Name | Optional |
| Age | Default Public |
| Home Town | Default Public |
| Location | Default Public |
| Photo (public) | Mandatory |
| Gender | Mandatory |
| Description (public) | Default Public |
| Relationship | Optional |
| Quote (public) | Default Public |
| IM Addresses | Optional |
| Email Address | Optional |
| Occupation | Optional |
| Work History | Optional |
| Interests | Default Public |
| Home Page | Optional |
| Yahoo! Areas | Optional |
| Schools | Optional |
| Organizations | Optional |
| Favorites | Optional |
| Industry | Optional |
| Military Groups | Optional |
| Military Divisions | Optional |
| Job Title | Optional |

| Requirement | Description |
|---|---|
| Viewing Profile Features | The following profile features should be displayed, given the conditions outlined below. These features are defined in more detail in other sections of this document. |
| First Degree Display | If the profile viewed is of a direct connection (one degree), the fields associated with the category(s) that the viewed user assigned to the viewing user is displayed. All fields enabled by all categories selected are displayed. |
| Managing Multiple Values for First Degree Display | For profile fields where multiple values are supported, such as photo and nickname, the values associated with the primary category are displayed. If space allows, links may be provided to other values (versions) of those fields associated with the assigned categories. For example, if Randy has assigned Mark into his Friend and Work categories (in that order), Mark will see Randy's "Friend' photo when viewing Randy's page with an ability to "toggle" to "Work" photo. |

1. User Profile

| Requirement | Description |
| --- | --- |
| First Degree Photo Links | User's profile should display thumbnail photos and nicknames of users in their network (up to three degrees). The user's photo is not displayed in this link.<br>When a SN user is viewing another user's profile that is in their network, they will see thumbnail photos and nicknames of users that are in that particular SN user's first degree. Clicking on the photo or the nickname will take them to the profile of the SN user displayed in the photo.<br>If a SN user is viewing another user's profile that is not in their network, they will not see the thumbnail photos and nicknames. By default, the public photo and nickname should be displayed. There are two rules that should be followed in determining which photo and nickname should be displayed. They are:<br>1. SN will display a category-specific photo/nickname instead of the public one, if it is available to the viewer.<br>2. The viewer will not see his own image/nickname displayed in a photo-links-list if he/she is viewing a profile of someone in his/her First Degree. Instead, a special area of the profile page being viewed will indicate that this is a First Degree connection and the category the viewer has assigned to this relationship. (See Network requirements for details on how categories are established.) |

2. Network

| Requirement | Description |
| --- | --- |
| | First Degree Connection Management |
| Creating and Managing Categories | Provide the ability to Create/Edit/Delete a user category, which is a classification for a group of users within an individual SN user's first-degree (e.g., friends, soccer teammates, co-workers, family).<br>These categories provide a convenient way for SN users to organize their First Degree Connections. SN users can use categories to control the information that they reveal about themselves (i.e., display different data fields in the profile viewed by members of a category) or to efficiently manage communications within their first degree network (i.e., send an email to all of their soccer teammates announcing the schedule for the next season).<br>SN users can define their own categories. Users can for example create/edit/delete up to 10 categories. |
| Assigning First Degree Connections to Categories | Provide the ability for SN users to assign people in their First Degree Connections to a category.<br>Users can be assigned to multiple categories. However, users do not need to be assigned to a category. All users not assigned to a category will be classified as "unassigned."<br>SN users can assign no more than the total number of First Degree Connections allowed to a category (i.e., 100% of their first degree connections can be assigned to a category). (See Abuse requirements for details on first degree connection limits.) |
| Re-Assigning First Degree Connections to Categories | Provide the ability for SN users to re-assign people to different categories. First Degree Connections can be re-assigned to "unassigned" status. |
| Establishing Custom Values by Category | Provide the ability for SN users to create/edit/delete custom values for a select group of data fields for each category. The data fields to be supported initially to include: nickname, photo, quote and description. If SN user creates a custom value for a category, this value will be displayed in the profile viewed by members of that category. Note: this is optional. If a SN user, does not establish a custom value, the primary value will be displayed in the profile viewed by a category(s) of users.<br>Custom Values cannot be established for "unassigned" first degree connections. |

2. Network

| Requirement | Description |
| --- | --- |
| Establishing Permissions by Category | Provide the ability for SN users to grant permission by category to display different data fields in the profile viewed by a particular category. SN users can change these permissions at any time.<br>By default, all categories, including unassigned, must be granted permission to view as much data that is viewable to the public, or any SN member outside the SN user's first degree network. (See User Profile requirements to see what data fields are must be viewed by the public, or Mandatory. See Network requirements to see details on how SN user's can set the depth of their network.) SN users cannot override this requirement. |
| Viewing First Degree Connections | Provide the ability for SN users to view their list of First Degree Connections. List to feature the following for each First Degree Connection: Nickname, Photo, Category Assignment(s). Include First and Last Name on the list, if the First Degree Connection has exposed this information to SN user via Category Permissions.<br>Provide ability for SN user to change category assignments from this list. |
| Viewing Category | Provide the ability for SN users to view their list of First Degree Connections by category. List to feature the following for each First Degree Connection: Nickname, Photo. Include First and Last Name on the list, if the First Degree Connection has exposed this information to SN user via Category Permissions. |
| Viewing Multiple Categories | Provide the ability for SN users to select to view more than one category of First Degree Connections at a time. For example, user may want to view Category 1, 3 and 5. SN user can select to view up to n categories at a time, where n is the total number of categories allowed. List to feature the following for each First Degree Connection: Nickname, Photo, Category assignment(s). Include First and Last Name on the list, if the First Degree Connection has exposed this information to SN user via Category Permissions. List is grouped by category. |
| Removing First Degree Connections | Provide ability for SN users to remove someone from their First Degree Connections. Doing so, will remove that person's connections from the SN user's network (two degrees and beyond). |

Network Management

| | |
| --- | --- |
| Previewing Profile Views | Provide the ability for SN users to preview those versions of their profile that are viewable/accessible to different classes (First Degree, 2+ Degrees, Public, by SN Activity) and categories (as defined by the SN user) of users. SN users should be able to go from Preview to Edit mode easily. |
| Establishing Permissions by Network Activity | Provide ability for SN user to grant permissions by Network Activity to display different data fields in the profile viewed by SN users outside of the user's First Degree Connections. Note, SN or the application or web property leveraging functionality will establish what fields must be displayed and searchable, if a user selected a particular intent. users cannot choose to have these fields hidden, but he/she can elect to reveal more information in his/her profile that's revealed to other SN members who are searching by intent.<br>We are proposing that for the initial release of SN the following fields must be displayed in user's profile which is viewable to public, or outside the user's First Degree Connections, and included in searches.<br><br>| Activity | Additional fields made Public (Searchable) |<br>| --- | --- |<br>| Friends | Interests, Quote, Description |<br>| Dating | Interests, Quote, Description, |<br>| Alumni | Schools, Organizations |<br>| Military | Military Division, Military Group |<br>| Help & Advice | Interests, Quote, Description |<br>| Careers | Job Title, Industry | |
| Invitation Refusal Tracking | Provide the ability for SN to track the number of invitations sent by a particular SN user that have been refused by recipients and given the refusal rate, limit the SN user's ability to send additional invitations. This feature provides a way to identify potential spammers. SN users who exceed a certain threshold will have their ability to send invitations curtailed. The following algorithm should be applied to determine when the threshold has been exceeded:<br>If the number of refusals is greater than or equal to x % of y invitations, where y is the maximum number of invitations that |

-continued

2. Network

| Requirement | Description |
|---|---|
| | SN allows to be outstanding at any given time per user, then only allow the SN user to have one invitation outstanding at any given time. For example a 10% refusal rate may apply if x = 10. |
| Notification of Refusal Rate | Provide ability to notify SN user when his/her refusal rate reaches half of the allowed percentage (x %). Notification shall include a warning to the SN user that if his/her refusal rate hits x %, then he/she will only be allowed to have one invitation outstanding at any given time. |
| Establishing Network Depth for Messaging Purposes | This provides SN users the ability to better control what kind of messages they receive from people in the SN network.<br>A SN user can define network depth for the following types of SN communications:<br>Invitations (to Join Network)<br>Email (SN) Messages<br>Instant Messages (IM)<br>Testimonial Submissions<br>A SN user will be able to choose from the following options when defining the depth of his/her network for incoming messages:<br>Zero Degree - No one allowed to send/initiate a message.<br>First Degree - Only Friends (people a SN user invites to join his/her First Degree Connections) can send messages.<br>Two Degrees - Friends and Friends of Friends can send messages.<br>Three Degrees - Friends, Friends of Friends, and Friends of Friends of Friends can all send messages.<br>Open to All - Anyone SN user can send messages. Need to make sure that SN users are warned that this option may open them up to possible spamming (e.g., being bombarded with requests from strangers.)<br>While SN users will be able to set their own preferences for defining network depth, the following will be set as defaults. Users will be able to change the defaults for Invitations and SN Messages, which is set at three degrees. By changing the degree of one, the other is also is affected (i.e., changing Invitations to 2 degrees would also change SN Messages to 2 degrees).<br>For example, Instant Messages and Testimonial Submissions can be fixed at 1 degree. |
| Sending Invites to Other SN Users | Provide ability for SN users to invite other SN users (targets) to join their First Degree Connections (network), subject to the network depth limitations defined by the targets.<br>A SN user should have the ability to initiate sending an invitation from the target's profile page, provided that the target has defined that SN user as being "in network." For example, the SN user, if within the target's allowed network, will see a Send Invite button on the target's profile page when it's being viewed by the SN user. Clicking on the invite button will result in the SN-to-SN email invitation being generated and sent, inviting the target to join the SN user's First Degree Connections (network).<br>If the SN user is not within the target's allowed network, or if the user does not allow invitations, the Send Invite button will not appear on the target's profile page when it's being viewed by the SN user.<br>See Establishing Network Depth for Messaging Purposes requirement for details on how network depth is applied. |
| Sending Invite to SN User, if Email Address is Known | Provide ability for a SN user to invite any other SN user (target) to join his/her First Degree Connections, if he/she has the email address of the target, regardless of whether that SN user is within the target's defined network for receiving messages. (Implication is that if the user has the target's email address than the two know each other and the target would not mind receiving an invite from this SN user. This feature provides an easy and convenient way for SN users to add people they know to their First Degree Connections.) However, SN user would first need to conduct a SN network search to confirm first that SN user is on the network. Once it's confirmed that that user is on the SN network, the SN-to-SN email invitation should be generated and sent, inviting the target to join the SN user's First Degree Connections (network).<br>See Search requirements for details on searching by email address for invitation purposes. |

-continued

2. Network

| Requirement | Description |
| --- | --- |
| Responding to SN-to-SN Email Invite | Provide ability to support the following sequence of actions when a SN user (target) receives a SN-to-SN email invitation from another SN user (sender), asking the target to join his/her First Degree Connections (network).<br>From within the email message, provide ability for target to choose from one of the following three actions:<br>1. Accept the invitation. If the target selects this option, then SN automatically includes sender in target's First Degree Connections, and vice versa, and sends a confirmation email to sender, indicating that target has accepted invitation. Target is given the option to assign sender to one of his/her categories. As a default, sender is assigned to the "unassigned" category. Similarly, from within the confirmation email, sender is given the option to assign target to one of his/her categories. As a default, sender is assigned to the "unassigned" category.<br>2. Reject the invitation. If the target selects this option, then SN automatically generates a standard rejection message to be sent to the sender. Provide ability for target to send a customized rejection message to sender.<br>3. Ignore the invitation. In this case, the target simply does not respond to the invitation. He/she can delete or just leave alone. Note: the sender's outstanding email invite limit is not adjusted until the invite expires.<br>Note: all messages mentioned in this requirement are sent from and received within the SN system. |
| Sending Invite to People via Yahoo ID | Provide ability for a SN user (sender) to invite anyone with a Yahoo! ID who is not a SN user (target) to join SN and, if target joins SN provide ability for target to include sender in his/her First Degree Connections (network) and invite sender to do the same. With this feature, if a user only knows a Yahoo ID, an invitation can be sent, and routed according to that recipient's mail preferences (as set in Yahoo Account Info)<br>In this event, a special invitation (SN-to-Yahoo ID email invitation) should be generated and then sent to the target inviting him/her to join SN and then once his/her SN account is established provide the ability for target to invite sender to join his/her First Degree Connections network. The target or recipient should be able to initiate the action to join SN and to invite sender to be in his/her First Degree Connections from the email invitation in a logical sequence:<br>1. Target follows steps required to join SN<br>2. Once target has joined SN, he/she will be asked if he/she wants to invite sender to join his/her First Degree Connections.<br>3. If no, then the sequence ends.<br>4. If yes, then SN will automatically include sender in target's First Degree Connections network assigned as an unassigned user. (See Network Requirements: Assigning First Degree Connections to Categories.) Sender can later re-assign user to a category, once he/she establishes categories.<br>5. Email will automatically be generated and sent from target to sender, inviting him/her to join target's First Degree Connections network.<br>6. Target can accept, reject or ignore target's request, in accordance with requirements defined in Network Requirements: Responding to SN-to-SN Invite.<br>Provide ability to support sending one or more invitations at a time. |
| Sending Invite to People with non-Yahoo! email address | Provide ability for a SN user (sender) to invite anyone with a non-Yahoo! email who is not a SN user (target) to join SN and, if target decides to join SN provide ability for target to include sender in his/her First Degree Connections (network) and invite sender to do the same.<br>In this event, a special invitation (SN-to-non-Yahoo ID email) should be generated and then sent to the target inviting him/her to join Yahoo! (or if he/she already has Yahoo! account provide ability for recipient to indicate that and associate with new SN account), SN and then once the target's SN account is established, provide ability for target to invite sender to join his/her First Degree Connections (network). The target or |

2. Network

| Requirement | Description |
|---|---|
| | recipient should be able to initiate all actions from the email invitation in a logical sequence:<br>1. Target is given option to provide Yahoo ID, if already have one, and want to use it to set up SN account<br>2. If target does not have Yahoo ID and wants to join SN, Target follows steps required to join SN<br>3. Once target has joined SN, he/she will be asked if he/she wants to invite sender to join his/her First Degree Connections.<br>4. If no, then the sequence ends.<br>5. If yes, then SN will automatically include sender in target's First Degree Connections network assigned as an unassigned user. (See Network Requirements: Assigning First Degree Connections to Categories.) Sender can later re-assign user to a category, once he/she establishes categories.<br>6. Email will automatically be generated and sent from target to sender, inviting him/her to join target's First Degree Connections network.<br>7. Target can accept, reject or ignore target's request, in accordance with requirements defined in Network Requirements: Responding to SN-to-SN Invite.<br>Provide ability to support sending one or more invitations at a time. |
| Invitation account merging | Intelligently merge invitations that may be sent to active SN users at email addresses that are not associated with their SN account. For example, if I'm registered on SN with XXX@yahoo.com, but someone invites me at XXX@yahoo.com, if I click on that invitation, it'll authenticate my SN membership, and then allow me to accept that invitation, even if I'm not associating XXX@yahoo.com with my SN profile. |
| Invitation Expiration | Provide ability for email invitations to expire within 30 days from when the email was originally sent. Once an invitation has expired, it is no longer valid which means that the recipient is not able to join the inviter's network and that email invitation does not count against the inviter's outstanding email invitation limit. Note: this only applies to SN-to-SN email invitations. |
| Responding to an Expired Invitation | If an invitee attempts to respond to an expired invitation, he/she will be directed to a web page, indicating that the invitation has expired and that the inviter will be notified that he/she attempted a response. |
| Responding to a reply about an expired Invitation | The inviter will then be notified that the recipient attempted to respond to an expired invitation. That way, the inviter can then choose to re-send an invitation to that invitee. |
| Sending Invites to People on Yahoo! Messenger Buddy List | Provide the ability for SN users to be able to send SN invitations td their buddy list from Yahoo! Messenger.<br>If the buddy has a SN account associated with the Yahoo! alias he/she is using for Yahoo! Messenger, then send the SN-to-SN email invitation, as described above in the Sending Invite to SN User if Email Address is Known,<br>Otherwise, send SN-to-Yahoo ID email invitation (as described above in Sending Invite to People with Yahoo! IDs who are not SN Users requirement) to Yahoo email address (Yahoo! ID) associated with the alias that buddy is using for Yahoo! Messenger. |
| Sending Invites to Contacts in Yahoo! Address Book | Provide the ability for SN users to import contact information from Yahoo! Address Book into SN and then be able to invite one, some or all of these contacts to join their First Degree Connections.<br>If the contact has a Yahoo! email address and a SN account associated with that Yahoo email address (i.e., primary alias), then generate and send SN-to-SN invitation email, as described above in Sending Invite to SN User if Email Address is Known requirement.<br>If the contact has a Yahoo! email address, but no SN account associated with that email address, then generate and send the SN-to-Yahoo ID invitation email, as described above in Sending Invite to People with Yahoo! IDs who are not SN Users requirement.<br>Otherwise, generate and send the SN-to-non-Yahoo ID invitation email, as described above in the Sending Invite to People with non-Yahoo email address requirement. |

-continued

| 2. Network | |
|---|---|
| Requirement | Description |
| Outstanding Invite Limit | Limit all SN users to having no more than y email invitations outstanding at any given time. An outstanding invitation is defined as an email invite sent to an existing SN user (SN-to-SN email invitation) sent where no action (refusal or acceptance) has been taken by the recipient. For example y = 100. |
| Tracking Outstanding Invite Limit | Provide ability for SN to be able to keep track of the number of outstanding invitations (SN-to-SN email invites) that every SN user has at any given point in time. Each time a SN user receives a response to a SN-to-SN email invite (accept, reject), SN should adjust the number of outstanding email invites for that particular user. |
| Viewing Number of Outstanding Email Invites | Provide ability for SN users to be able to view the number of outstanding email invites that he/she has at any given point in time. Should also display the number of email invites that SN user is still able to send before reaching limit. |
| Network Tools | |
| Forward to a Friend | Provide ability for SN users to send an auto-generated email to someone within their First Degree Connections, alerting them to someone they found that might be of interest to that First Degree Connection. The email should include a link to the profile of the "person of interest." |
| Add/Remove Bookmark | Provide ability for SN users to bookmark a profile (target profile) of another SN user that they found interesting. SN users can add or remove a bookmark to a profile by clicking on an Add Bookmark or Remove Bookmark button that appears on the target profile. The conditions under which the Add Bookmark or Remove Bookmark button will appear on a particular profile are stated in User Profile requirements section. |
| View Bookmarks | Provide ability for SN users to view list of Bookmarks and from that list link to any of the Bookmarked profiles. |
| Establishing Category Permissions to View Bookmarks | Provide the ability for SN users to grant permission by category to view their Bookmarked profiles. For instance, SN user can grant Category 1 permission to view their Bookmarked profiles, but not allow Categories 2-6 to view their Bookmarked profiles. |
| Ignore User | Provide ability for SN users to turn off communications from, or ignore, any person on the network. SN users can set the ignore feature "on" or "off" for any person on the network by clicking on the Ignore or Un-ignore button that appears on that person's profile. The conditions under which the Ignore or Un-Ignore button will appear on a particular profile are stated in the User Profile requirements section.<br>Note: the Ignore feature only affects communications sent by the Ignored person, and not the connections related to that Ignored person, provided that the Ignored person is within the SN user's network.<br>Note: the person that's being ignored will not know that someone has elected to ignore them. They can continue to send communications to the person that's ignoring them, those communications will just not be received by the person that has turned the ignore feature "on." |

| 3 Searching/Matching Categorization | |
|---|---|
| Requirement | Description |
| Search results | The goals of a search are to identify SN users for some particular activity: building the network, messaging to an individual or group, event planning, recreational browsing, etc. For this document, we will divide searching into two categories: Invitation Search, and Advanced Search.<br>Matching results are displayed as a list of navigable public photos and nicknames. The search used criteria are displayed, and another search can be generated directly from the results page. Search results are limited to 250 entries. Those entries are displayed and the user is urged to further refine their search criteria. The count of results is reported as "more than 250" instead of reporting the exact number of matches. |

-continued

| 3 Searching/Matching Categorization | |
|---|---|
| Requirement | Description |
| Search Results Messaging | Any subset of search results may be used as an addressee list for email/IM/chat/etc, subject to the permission settings for those recipients. |
| Invitation Search | Invitation Search is a distinct feature for searching for new connections in the entire SN membership database. The user may only search on Email address or First and Last name. Any search results display a send invitation link, subject to target permissions. [See the Invitation features in the Networking section for details on the Invitation process and permissions.] For example, to intelligently find people. i.e., Have the system compare the profiles, find similarities, and highlight the ones with more common fields (e.g., school, work history). |
| Advanced Search | Activity Search provides the means for people to search their Categories, Network, or all members for people to interact with using SN tools.<br>Users are unable to conduct a search that would return the entire SN member database. One search criteria is required to be set to something other than an all-inclusive value.<br>This search tool lets users set multiple criteria for each search:<br><br>| Criteria | Type | Default Value |<br>\|---\|---\|---\|<br>\| People with \| Boolean \| Set \|<br>\| First name \| Text \| [no value] \|<br>\| Last name \| Text \| [no value] \|<br>\| Email \| Email \| [no value] \|<br>\| Interest \| Text \| [no value] \|<br>\| Gender \| M/F/[no value] \| [no value] \|<br>\| Age \| Integer \| [no value] \|<br>\| SN Intent \| List [See \| [no value] \|<br>\| Limit search to \| All/ \| In my network \|<br>\| Distance from \| Anywhere/Stat \| 25 miles \|<br>\| Nickname \| Text \| [no value] \|<br>\| Home Town \| Text \| [no value] \|<br>\| Home Town \| Text \| [no value] \|<br>\| Relationship \| Married/Single/[no value] \| [no value] \|<br>\| Occupation, Work History, School, or Organization \| Text \| [no value] \|<br>\| Favorites \| Text \| [no value] \| |
| Matching | This feature is an automated activity search. Based on the user's profile, Intent, Interests, Gender, Age, Location, etc.] this feature generates a search to suggest matches for friends, hobbies, groups, or business networking. The results are displayed via Activity Search, and the user may refine the search from there.<br>See the fields searched are the intersection of those shown in Establishing Permissions by Network Intent and Activity Search:<br><br>| Activity | Searched Fields |<br>\|---\|---\|<br>\| Friends \| Location, Interests \|<br>\| Dating \| Location, Interests, Age, Gender, Relationship \|<br>\| Alumni \| Schools, Organizations \|<br>\| Military \| Schools, Organizations \|<br>\| Help & Advice \| Interests \| |
| Introductions | An Introduction is a brokered connection.<br>Example: A is connected to B and B is connected to C, but A can't send an invitation to C, due to permission settings. With this feature, A can request an Introduction to C via B.<br>To support this feature, a new category permission is required: Will make introductions. Enabling this permission for a category will allow those in that category to request introductions via the user.<br>There is a separate user preference: Will accept introductions, which is active by default.<br>When an out-of-network profile (C) is displayed and a first degree connection (B) is able to introduce the viewer (A) to the target (C), an option is displayed to "Request an introduction via (B)". |

-continued

| | 3 Searching/Matching Categorization |
|---|---|
| Requirement | Description |
| | When the broker (B) receives the introduction request message, they must choose to:<br>Accept it and forward the introduction on to the target (C) with optional additional text<br>Delete (Ignore) it<br>Decline to complete the introduction and reply to the sender (A) with optional additional text.<br>An Introduction that reaches its target (C) is treated as an Invitation. |

| | 4. Communication/Publishing |
|---|---|
| Requirement | Description |
| | In-Network Communication |
| SN Alerts | There will be an area in the communication area that is separate from the SN Messages. The SN Alerts area will provide actionable alerts on activities, such as Invitations, Introductions, Chat Invites, Testimonial Submissions. Those alerts will include actionable links in response to the those emails. |
| Sending SN Email Messages | Provide ability for SN users to compose, edit and send email communications (SN Messages) (one-to-one and one-to-many) to other SN users in their network who have given them permission to do so. (See Network Requirements: Establishing Network Depth for Messaging Purposes for details on defining who can send email messages.)<br>Email communications are initiated from within SN interface. Need to provide an easy and convenient way for SN users to know who is willing to accept an email communication from them so that they do not send email messages to people who have not granted them permission to send them.<br>SN users should be able to easily send SN Messages to an individual or a group of individuals within their network. In the case of a group, SN users should be able to easily send to a random group of users within their network (i.e., not organized into a category) or to a category(s) of users within their First Degree Connections. (See Category Messages requirement that appears below.) |
| SN Message Format | The SN Message should support the following format requirements:<br>The sender's Nickname, and possibly Photo, should be included within the message so that it's clear to the recipient who has sent the SN Message.<br>The recipient's name or category descriptor should only be visible to the sender. Recipients are never able to see the other parties who received the SN Message. |
| Creating/Editing Draft SN Messages | Provide ability for SN users to create/save/edit and eventually send draft versions of SN Messages. |
| Viewing SN Messages | Provide ability for SN users to be able to read, delete or respond to all SN messages received. |
| Viewing SN Messages - Summary View | Provide ability for SN users to be able to view all sent and received SN communications, including SN Messages, Provide ability to review at summary level all sent and received communications and from this summary level provide ability to user to be able to link to the actual communication (sent communication, received communication).<br>Indicate to recipient which SN Messages have not been read. |
| Forwarding SN Messages | Provide ability for SN users to be able forward SN Messages to their Yahoo! Mail account. |
| Message Expiration | SN should store all SN Messages and/or SN communications, such as invitations, or testimonials submitted for approval, for up to 120 days or whatever is standard for Yahoo Personals. |
| Sending Instant Messages to SN Users | Provide the ability to support integration with Yahoo! Messenger. Integration, at a minimum, should support providing SN users with the ability to initiate a Yahoo! Messenger communication (one-to-one and one-to-many) from within SN interface, provided they have Yahoo! Messenger software installed and have signed up for the service. |

| 4. Communication/Publishing | |
|---|---|
| Requirement | Description |
| | Provide ability for SN users to compose and send Instant Messages to other SN users in their network who have given them permission to do so and are online. (See Network Requirements: Establishing Network Depth for Messaging Purposes for details on defining who can send instant messages.)<br>SN users should be able to easily send instant messages to an individual or a group of individuals within their network. In the case of a group, SN users should be able to easily send to a random group of users within their network (i.e., not organized into a category) or to a category(s) of users within their First Degree Connections. (See Category Messages requirement that appears below.)<br>Instant Messages are only viewable from within Yahoo! Messenger client software. |
| Sending Chat Invites | Provide the ability to support integration with Yahoo! Chat. Integration, at a minimum, should support allowing SN users to initiate chat invites and link to chat sessions from within SN interface.<br>Provide the ability for SN users to send chat invites from within the SN interface to one or more individuals within their network who have given them permission to do so and are online. (See Network Requirements: Establishing Network Depth for Messaging Purposes for details on defining who can send chat invites.)<br>Need to provide an easy and convenient way for SN users to know who is willing to accept a chat invite from them so that they do not send chat invites to people who have not granted them permission to send them. Also, need to provide a way for SN users to know who in their network is online so they know who is available to participate in a chat session.<br>SN users should be able to easily send a chat invite to an individual or a group of individuals within their network. In the case of a group, SN users should be able to easily send to a random group of users within their network (i.e., not organized into a category) or to a category(s) of users within their First Degree Connections. (See Category Messages requirement that appears below.)<br>Chat Invites are sent to the SN user's SN Message Inbox, or some other centralized location established by UED for viewing and managing incoming messages.<br>Chat invite messages should include a link to the hat session. |
| CategoryMessage | Provide an easy and intuitive way for SN users to send communications, including SN Message, IM, Chat Invite,. SMS to all those individuals within one or more of their categories.<br>SN users should have the ability to compose a category message. The SN user's Nickname (in the case of SN Messages, Chat Invites and SMS) should appear in the "from" field. The "to" field in the message should be hidden or contain the category name (as defined by the SN user), depending upon the SN user's preference. Preferences can be established for each CategoryMessage. For instance, a message from SN user, MarkB, to his individuals in his poker buddies category, would read: From: MarkB; To: Poker Buddies. |
| Revised CategoryMessage distribution | Provide the ability for SN users to delete recipients from a category message. For instance, I want to send a message to all but 2 of my poker buddies. |
| Communication Alerts | Provide ability for SN to generate and send alerts to a SN user when he/she has received new SN communications, including SN Messages, Invitations, Introductions, Testimonial Submissions and Chat Invites.<br>SN users can choose to receive email alerts in one of the following ways:<br>Single Alert - Alert is sent each time a new SN communication is received. Alert message should include the Nickname, Photo and subject line of the new SN communication, along with the time the message was received. Single Alert message should include a link to the new SN communication. Note: If user is not already logged onto SN, he/she will need to log into SN before viewing the new SN Message. The sequence should allow the user to log on, and then take him/her directly to the new SN communication<br>Receive no alerts - Users can opt not to receive any notification via email about activity, and choose instead to go to the site for updates. |

4. Communication/Publishing

| Requirement | Description |
| --- | --- |
| Digest Version of Communication Alerts | Digest Message - Alert is sent once per day, indicating all of the new SN communications that have been received that day.<br>Digest message should include the Nickname, Photo, subject line and time received for each new SN communication received that day. Digest Alert message should include a link to a centralized place (perhaps an Inbox, if that's a UI element that is chosen to be used for SN) from which all new messages can be reviewed.<br>Note: If user is not already logged into SN, he/she will need to log into SN before viewing InBox. The sequence should allow the user to log on, and then take him/her directly to the new SN communication. |
| Establishing Communication preferences | Provide ability for SN users to determine how they prefer to receive alerts from SN (either via email, IM, SMS or none). If email is chosen, the alerts are sent to the primary email account associated with the SN user's profile. |
| Blog Alerts | Provide ability for a SN user to choose to receive a SN message whenever a particular. user (target) update's his/her blog. This feature can be enabled/disabled from the target profile's blog. (See User Profile: Viewing Profile Features requirement.)<br>A SN user may track up to 25 SN blogs at a time.<br>Blog alerts should not be sent instantaneously. Instead there should be an x-minute lag time. between the time the blog update is posted by the target and the SN user is alerted. This will allow us to support scale requirements and discourage the use of blogs as a chat medium. |

Publishing

| Requirement | Description |
| --- | --- |
| Posting Photos | Provide ability for SN users to upload from PC and post photos on their SN profile. (Note: this requirement refers to photos that are separate from the primary SN profile photo.)<br>Users will have the ability to post a caption with each uploaded photo.<br>Note: The uploaded photos will be viewable from the SN profile, but will be stored in a Yahoo! Photos account. The size and positioning of the photos that are uploaded and displayed on the user's profile page should not be determined by individual users. SN users will not be able to edit or print displayed photos from within SN interface. However, we will need to make it clear to the user, through the interface design, that he/she can edit and arrange to have photos printed from within Yahoo! Photos and that he/she already has a Yahoo! Photos account. Should provide a link to user's Yahoo! Photos account from within the SN experience.<br>The user will be allowed to submit up to a certain number of photos. |
| Yahoo! Photos Integration | Provide easy and intuitive link from user's SN home page to user's Yahoo! Photos account so that user can engage in Yahoo! Photos activities, including editing and printing the photos displayed on SN profile. |
| Adding Testimonial | Provide ability for a SN user to create a testimonial for another SN user (subject) and submit to the subject SN user for review and approval. Note: only SN users who have been granted permission by the subject user to submit a testimonial should be allowed to create a testimonial. (See Network Requirements: Establishing Network Depth for Messaging Purposes for details on defining network depth allowed for writing testimonials.)<br>SN user should be able to initiate this action (e.g., creating a testimonial) from within the subject user's profile. See User Profile requirements: Viewing Profile Features<br>The submitted testimonial should appear in the subject SN user's SN Testimonial area for review and consideration. An alert will be sent to SN Alerts |
| Approving Testimonial | Provide ability for a SN user to approve, reject or ignore a testimonial that has been submitted for review.<br>If the SN user approves the testimonial, it should be posted immediately to his/her profile and viewable to all those to whom the SN user has granted permission to view.<br>If the SN user rejects the testimonial, an auto-generated email should be sent to the SN user who submitted the testimonial (testimonial writer), stating that his/her testimonial has been rejected. Need to be able to provide ability for the rejecting SN user to customize the email stating a reason why the testimonial has been rejected. The testimonial rejection should appear in the testimonial writer's SN Message Inbox. |

| 4. Communication/Publishing | |
|---|---|
| Requirement | Description |
| | If the SN user chooses to ignore the testimonial, then no action is taken and the testimonial will remain as a message in the subject user's SN Message Inbox, subject to the message expiration requirement. |
| Testimonial Display | Display the approved testimonial on the subject SN user's profile. The testimonial writer's photo, Nickname and testimonial submission date should appear along with the testimonial. |
| Testimonial Deletion | Provide ability for subject SN user or testimonial writer to be able to delete testimonials after they have been displayed, SN users should be able to initiate both actions from within the subject SN user's profile page. |
| Writing Blog | Provide the ability for SN user to create a blog, or journal. SN user can create multiple entries for his/her blog. Each blog entry is time-stamped. SN blogs will permit limited text formatting, including bold, italics, lists, text colors and hyperlinks. |
| Posting Blog Comments | Provide ability for SN user to post comments to another SN user's (target) blog, provided that SN user has been granted permission by the target to be able to submit a blog entry. See Network Requirements: Establishing Network Depth for Messaging Purposes requirement for details on defining network depth for blog entries. Note: SN users may not allow any other SN users to post comments to their blog. SN user should be able to initiate this action from the page in which the blog appears. |
| Blog Display | Display the most recent blog entry or a digest version of recent entries, including comments posted by other users, on the SN user's profile page. Need to be able to provide easy and intuitive access to the complete set of blog entries, including blog comments. UED to determine optimal way of displaying blog entries and comments. |
| Blog Rolling | Provide ability for SN user to identify those non-SN blogs that he/she would like to link to from his/her profile page. |
| Blog Rolling Feed | Provide ability for SN to pull content from other non-SN blogs and display on a SN user profile page. Displayed content to include: Blog writer's name and title of latest posting. |
| Groups | Allow users to create and join groups based upon Yahoo Groups category structure and interest matching. For example, Interest search results will offer a link to Find Yahoo! groups related to SEARCH_TERM which, when clicked, will take the user to the groups http://groups.yahoo.com/search?query=SEARCH_TERM. A preference will be provided to show the user's current group memberships on their profile. This display will be subject to category-based permission control. |
| Recommendations | The ability for aliases to make recommendations on products, movies, restaurants, services, etc. is presently available. While logged into SN, the associated Yahoo! alias will be the active profile for services such as Movies, Messenger, and Chat. Movies, Shopping, and other Y! properties that support ratings and recommendations will support in-network searching criteria: "What movies do my friends thing are good" A preference will be provided to show the user's recent reviews on their profile. This display will be subject to category-based permission control. Preferably the SN will integrate with Yellow Pages, Maps, Media, Entertainment, Information, Finance, Commerce, et al. |
| Listings | Short term: Users can create/delete a limited number (e.g., 5) of listings for items or services for sale, purchase or hire. These ads displayed on the poster's profile page as well as on the communication control page of each member of their network. |
| Events | Events are date and location specific meetings, either physical or virtual. Users can create events which are stored in Yahoo! Calendar using the standard format. The event invitations are addressed to SN IDs (via Category or Degree messaging) and may also be sent to addresses and contain the standard "add this event to your calendar" link. The calendar RSVP mechanism is supported. |

| 5. Preferences/Controls | |
| --- | --- |
| Requirement | Description |
| Friend Categorization | |
| Communication Control | All messaging is controlled through one control interface: Pending add friend requests, pending testimonials, pending messages, recent friend activity (adds, removes, testimonials, blog watch, etc.) and online status, alerts.). |
| General Preferences | Profile field editing, notification settings, and category management and permissions control (mostly outlined in Categories above.) Notification settings include alert types (requests, posts, watches, etc.) and selecting delivery media (email, IM, SMS). We will offer a spam-me option for out-of-network users to request a connection. Other opt-in/opt-out features go here. |
| Abuse and Moderation | |
| Flag Profile for Review | Every SN profile will clearly display a button for reporting that the profile violates TOS. The target reporting page will describe the expected effects of filing a report and a link to the SN TOS. |
| Preemptive Profile Picture Review | SN profile pictures (those displayed on a SN profile page) are subject to review moderation and the photos are not displayed until they have been approved. |
| Reactive Profile Content Review | Other than pictures, profile content is not preemptively reviewed. If a profile is flagged by a user using the on-page reporting button, the entire profile will be reviewed and appropriate action taken. |
| Automated Content Review | Automated scanning of SN profiles' free-form text fields for these patterns will flag suspicious profiles for review. |
| Automated Traffic Analysis | Various message thresholds and rate limits are set to detect potential abusive behavior. These will be used to flag accounts for review |
| Rate Limit: Invitation Refusal Tracking | A SN profile may be suspended. A suspended SN profile looks and behaves like a deleted one, with one exception: the connections in the suspended profile are preserved for tracking purposes. |
| SN Profile Deletion | A SN profile may be deleted. Deleting a SN profile will remove all SN-specific information from as well as remove all SN connections. The deleted profile will not be returned in any search results. |
| SN Profile Suspension | Users will be allowed to delete their own SN Profile, subject to a login-check. |

Those skilled in the art will recognize that the method and system of the present invention has many applications, may be implemented in many manners and, as such, is not to be limited by the foregoing exemplary embodiments and examples. In this regard, any number of the features of the different embodiments described herein may be combined into one single embodiment and alternate embodiments having fewer than all of the features are possible. Moreover, the scope of the present invention covers conventionally known and future developed variations and modifications to the system components described herein, as would be understood by those skilled in the art.

What is claimed as new and desired to be protected by Letters Patent of the United States is:

1. A method comprising:
receiving, at a social networking server over a network, user data from a plurality of users;
storing, via the social networking server in an associated database, the received user data;
receiving, by the social networking server, information related to a user's intent to utilize a service of a social network provided by the social networking server;
creating, via the social networking server, a user profile for the user, said user profile comprising a plurality of data fields, a first portion of said data fields being specific to the intended service and accessible by other users accessing the user profile, a second portion of the data fields having features enabling their customization when other users access the user profile, said creation of said user profile comprising storing, within the plurality of data fields of the user profile, the received user data for the user;
generating, via the social networking server, a social networking page for the user on the computerized social network, said generated social network page for the user comprising content associated with the received user data stored in the data fields of the user profile;
communicating, via the social networking server, data field controls for only the second portion of data fields to the user via the social networking page, said communication comprising:
causing, via the communication by the social network server, said second portion data field controls to be displayed to the user for selection via the social networking page, said second portion data field controls comprising selectable instruction options for controlling which content stored in the second portion of data fields is displayable on the social networking page of the user based on an identity of a visiting user of the social networking page, and
causing, via the communication by the social network server, exposure of functions specific to the computerized social network;
receiving, at the social networking server, a selection of said second portion data field controls, said selection providing actionable instructions that control how the social networking server provides the stored second portion data field content to said visiting user;

receiving, at the social networking server, function instructions that permit only certain functions of the exposed social networking functions to be enabled for said selected second portion data field controls;

receiving, at the social networking server, a request to view said social networking page from the visiting user;

analyzing, via the social networking server, said visiting user request, said analysis of the visiting user request comprising determining a version of the stored content of the social networking page that is accessible by the visiting user, said determination is based on said social networking server automatically executing, in response to said received request, said actionable instructions associated with the second portion data field controls for said stored content and generating, via said social networking server, said version based on said execution; and communicating, via the social networking server, said generated version of the stored content of the social networking page to the visiting user, wherein said version includes content of the first portion of data fields and only the content in the second portion data fields identified in the selected second portion data field controls as accessible to said visiting user in accordance with the function instructions.

2. The method of claim 1, further comprising:
instructing the social networking server to enable the visiting user to execute said functions based on the received function instructions.

3. The method of claim 2, wherein said certain functions are accessed through a data field of the user profile.

4. The method of claim 2, wherein said certain functions are accessed in accordance with said function instructions by selecting from a group consisting of other applications, other networks and other social networks.

5. The method of claim 1, wherein said plurality of functions comprises performing a function selected from a group of functions consisting of scraping, searching and filtering.

6. The method of claim 1, wherein the social network is a computerized service that implements a portal environment for communicating information to and from users of the social network, the social network utilizing information available through various portal services of the portal environment that each user has interacted with, and integrating said information within the social network.

7. The method of claim 1, further comprising:
determining a user relationship between the user and the visiting user;
identifying a category of relationship based on said determined user relationship; and
creating data field instructions for said category, said data field instructions being in accordance with said selected data field control.

8. The method of claim 7, wherein the user relationship comprises a degree of closeness between the user and the visiting user.

9. The method of claim 8, wherein the category, based on the degree of closeness, enables the user to control which user data fields can be accessed by the visiting user.

10. The method of claim 8, wherein the category, based on the degree of closeness, enable the user to manage communication with each member of the category.

11. The method of claim 1, further comprising:
receiving third party data field instructions from the user to permit access to only said certain data fields of said user data to a user selected third party.

12. A social networking server comprising:
a processor;
a non-transitory computer-readable storage medium for tangibly storing thereon program logic for execution by the processor, the program logic comprising:
logic executed by the processor for receiving, at the social networking server over a network, user data from a plurality of users;
logic executed by the processor for logic executed by the processor for storing, via the social networking server in an associated database, the received user data;
logic executed by the processor for receiving, by the social networking server, information related to a user's intent to utilize a service of a social network provided by the social networking server;
logic executed by the processor for creating, via the social networking server, a user profile for the user, said user profile comprising a plurality of data fields, a first portion of said data fields being specific to the intended service and accessible by other users accessing the user profile, a second portion of the data fields having features enabling their customization when other users access the user profile, said creation of said user profile comprising storing, within the plurality of data fields of the user profile, the received user data for the user
creating, via the social networking server, a user profile for a user, said user profile comprising a plurality of data fields, a first portion of said data fields being specific to a service provided by the social networking server and always being accessible by other users accessing the user profile, a second portion of the data fields having features enabling their customization related to their access and display when said other users access the user profile, said creation of said user profile comprising storing, within the plurality of data fields of the user profile, the received user data for the user;
logic executed by the processor for generating, via the social networking server, a social networking page for the user on the computerized social network, said generated social network page for the user comprising content associated with the received user data stored in the data fields of the user profile;
logic executed by the processor for communicating, via the social networking server, data field controls for only the second portion of data fields to the user via the social networking page, said communication comprising:
logic executed by the processor for causing, via the communication by the social network server, said second portion data field controls to be displayed to the user for selection via the social networking page, said second portion data field controls comprising selectable instruction options for controlling which content stored in the second portion of data fields is displayable on the social networking page of the user based on an identity of a visiting user of the social networking page, and logic executed by the processor for causing, via the communication by the social network server, exposure of functions specific to the computerized social network;

logic executed by the processor for receiving, at the social networking server, a selection of said second portion data field controls, said selection providing actionable instructions that control how the social networking server provides the stored second portion data field content to said visiting user;

logic executed by the processor for receiving, at the social networking server, function instructions that permit only certain functions of the exposed social networking functions to be enabled for said selected second portion data field controls;

logic executed by the processor for receiving, at the social networking server, a request to view said social networking page from the visiting user;

logic executed by the processor for analyzing, via the social networking server, said visiting user request, said analysis of the visiting user request comprising determining a version of the stored content of the social networking page that is accessible by the visiting user, said determination is based on said social networking server automatically executing, in response to said received request, said actionable instructions associated with the second portion data field controls for said stored content and generating, via said social networking server, said version based on said execution; and logic executed by the processor for communicating, via the social networking server, said generated version of the stored content of the social networking page to the visiting user, wherein said version includes content of the first portion of data fields and only the content in the second portion data fields identified in the selected second portion data field controls as accessible to said visiting user in accordance with the function instructions.

13. The social networking server of claim 12, further comprising:
logic executed by the processor for instructing the social networking server to enable the visiting user to execute said functions based on the received function instructions.

14. The social networking server of claim 13, wherein said certain functions are accessed through a data field of the user profile.

15. The social networking server of claim 13, wherein said certain functions are accessed in accordance with said function instructions by selecting from a group consisting of other applications, other networks and other social networks.

16. The social networking server of claim 12, wherein said plurality of functions comprises performing a function selected from a group of functions consisting of scraping, searching and filtering.

17. The social networking server of claim 12, further comprising:
logic executed by the processor for determining a user relationship between the user and the visiting user;
logic executed by the processor for identifying a category of relationship based on said determined user relationship; and
logic executed by the processor for creating data field instructions for said category, said data field instructions being in accordance with said selected data field control.

18. The social networking server of claim 12, further comprising:
logic executed by the processor for receiving third party data field instructions from the user to permit access to only said certain data fields of said user data to a user selected third party.

* * * * *